(12) United States Patent
Sone et al.

(10) Patent No.: US 11,101,592 B2
(45) Date of Patent: Aug. 24, 2021

(54) CONNECTOR HOLDING STRUCTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kosuke Sone, Mie (JP); Kaho Hayashi, Mie (JP); Tetsuji Tanaka, Mie (JP); Makoto Higashikozono, Mie (JP); Keishi Kitamura, Mie (JP); Yasuto Takeda, Mie (JP); Takahiro Maruyama, Mie (JP)

(73) Assignees: AutoNetworks Technologies, Ltd.; Sumitomo Wiring Systems, Ltd.; Sumitomo Electric Industries, Ltd.

(*) Notice: Subject to any disclaimer, the term of this patent is extended or adjusted under 35 U.S.C. 154(b) by 0 days.

(21) Appl. No.: 16/642,272

(22) PCT Filed: Jul. 24, 2018

(86) PCT No.: PCT/JP2018/027635
§ 371 (c)(1),
(2) Date: Feb. 26, 2020

(87) PCT Pub. No.: WO2019/044278
PCT Pub. Date: Mar. 7, 2019

(65) Prior Publication Data
US 2021/0083418 A1    Mar. 18, 2021

(30) Foreign Application Priority Data
Aug. 30, 2017  (JP) .............................. JP2017-165493

(51) Int. Cl.
*H01R 11/00* (2006.01)
*H01R 13/436* (2006.01)
(Continued)

(52) U.S. Cl.
CPC .......... *H01R 13/436* (2013.01); *B60R 16/02* (2013.01); *H01R 13/502* (2013.01); *H01R 13/56* (2013.01); *H01R 13/58* (2013.01)

(58) Field of Classification Search
CPC ..................... H01R 13/5825; H01R 13/5841
(Continued)

(56) References Cited

U.S. PATENT DOCUMENTS 9,130,283 B1* 9/2015 Lin .................... H01R 13/5841
9,570,841 B2* 2/2017 Kitamura ........... H01R 13/5833
(Continued)

FOREIGN PATENT DOCUMENTS

JP          3-103575          10/1991
JP          2015-047025        3/2015
(Continued)

OTHER PUBLICATIONS

International Search Report dated Oct. 9, 2018.

*Primary Examiner* — Phuong Chi Thi Nguyen
(74) *Attorney, Agent, or Firm* — Gerald E. Hespos; Michael J. Porco; Matthew T. Hespos

(57) ABSTRACT

A connector holding structure is provided with a plurality of connectors to be connected to a plurality of mating connectors arranged in an arrangement direction, a plurality of wires drawn out from the plurality of connectors, and a connector holding member including a plurality of connector mounting portions for respectively holding the plurality of connectors, the connector holding member collectively holding the plurality of connectors. The connector holding member includes a deflectable and deformable flexible portion between adjacent ones of the plurality of connector mounting portions.

7 Claims, 44 Drawing Sheets

(51) Int. Cl.
*B60R 16/02* (2006.01)
*H01R 13/502* (2006.01)
*H01R 13/56* (2006.01)
*H01R 13/58* (2006.01)

(58) Field of Classification Search
USPC ........................................ 439/506, 595, 501
See application file for complete search history.

(56) References Cited

U.S. PATENT DOCUMENTS

| | | |
|---|---|---|
| 9,640,955 B2 * | 5/2017 | Kitamura .............. H02G 3/0406 |
| 9,698,523 B2 * | 7/2017 | Kitamura ............ H01R 13/5829 |
| 9,698,552 B2 * | 7/2017 | Kitamura .............. H01R 13/582 |
| 10,211,566 B2 * | 2/2019 | Nagayama ......... H01R 13/5825 |
| 10,411,400 B2 * | 9/2019 | Nagayama ........... H01R 13/506 |
| 2016/0197435 A1 | 7/2016 | Kitamura et al. |
| 2016/0197461 A1 | 7/2016 | Kitamura et al. |
| 2016/0240963 A1 | 8/2016 | Kitamura et al. |

FOREIGN PATENT DOCUMENTS

| | | |
|---|---|---|
| JP | 2015-103316 | 6/2015 |
| JP | 6103381 | 3/2017 |
| WO | 2015/019841 | 2/2015 |
| WO | 2015/020195 | 2/2015 |

\* cited by examiner

CONNECTOR HOLDING STRUCTURE

BACKGROUND

Field of the Invention

This specification relates to a connector holding structure.

Related Art

Solenoid valves for hydraulic control are provided side by side on a device disposed in a case in an automatic transmission of an automotive vehicle, and each of these solenoids is provided with a connector part. A plurality of connectors connected to an external circuit are fit and connected to these connector parts. An example of such a connection structure is known from Japanese Patent No. 6103381.

In Japanese Patent No. 6103381, wires drawn out from respective connectors are accommodated in an extra length adjusting portion provided in a rear end part of a housing. A front side of the extra length adjusting portion in a connecting direction serves as a slit-like first insertion portion in which the wires can be densely aligned in a row in a height direction and a rear side thereof serves as a second insertion portion in which the wires can be aligned in a scattered manner in the height direction and a front-rear direction. The wires drawn out from the respective connectors are folded back and accommodated into the second insertion portion after being accommodated into the first insertion portion. The adjacent connectors are brought closer to the connector parts on the device side and successively connected while being substantially connected by the wires.

However, in the above configuration, the wires pulled out from the respective connectors have to be bent at a right angle to extend along the back surface of the housing and inserted into the narrow slit-like first insertion portion. Thus, a wiring operation is difficult. Further, the adjacent connectors are connected by the wires, and the postures and arrangement thereof are unstable and handling has been poor.

The invention disclosed in this specification was completed on the basis of the above situation and aims to improve workability in connecting a plurality of connectors to a plurality of mating connectors.

SUMMARY

This specification is directed to a connector holding structure with connectors to be connected respectively to mating connectors arranged in an arrangement direction. Wires are drawn out from the connectors. A connector holding member includes connector mounting portions for respectively holding the connectors. The connector holding member collectively holds the connectors, and includes a deflectable and deformable flexible portion between adjacent connector mounting portions.

According to this configuration, the connectors are held collectively by the connector holding member. Thus, the connectors can be aligned stably and brought closer to the mating connectors in nearly proper postures.

Further, the connector can be moved forward or rearward by deflecting the flexible portion at the time of connection to the mating connector, and inclination can be absorbed if the mating connector is inclined.

Workability in connecting the connectors to the mating connectors is improved in this way.

The flexible portion may include a first flexible portion deflectable and deformable in the arrangement direction of the connectors and a connecting direction to the mating connectors and a second flexible portion deflectable and deformable in a direction intersecting the arrangement direction and the connecting direction.

The connector holding member may be configured such that the connector mounting portions are mounted on a flexible sheet extending along the arrangement direction of the plurality of connectors.

Furthermore, the connector mounting portion may be mounted on the flexible sheet by a mounting protrusion including a shaft projecting toward the flexible sheet and configured to penetrate through a hole formed in the flexible sheet and an enlarged diameter portion enlarged in diameter on a tip side of the shaft and to be locked to a peripheral edge part of the hole.

The connector may have an integral wiring groove for accommodating the wires along the arrangement direction of the connectors. According to this configuration, the wires drawn out from the connectors can be routed collectively.

An opening of the wiring groove may be closed by the connector holding member. According to this configuration, it is not necessary to provide the connector with a lid for closing the wiring groove or separately provide a lid for closing the wiring groove and the number of components can be reduced.

According to this specification, it is possible to improve workability in connecting connectors to a plurality of mating connectors.

DETAILED DESCRIPTION

First Embodiment

Figure 1:
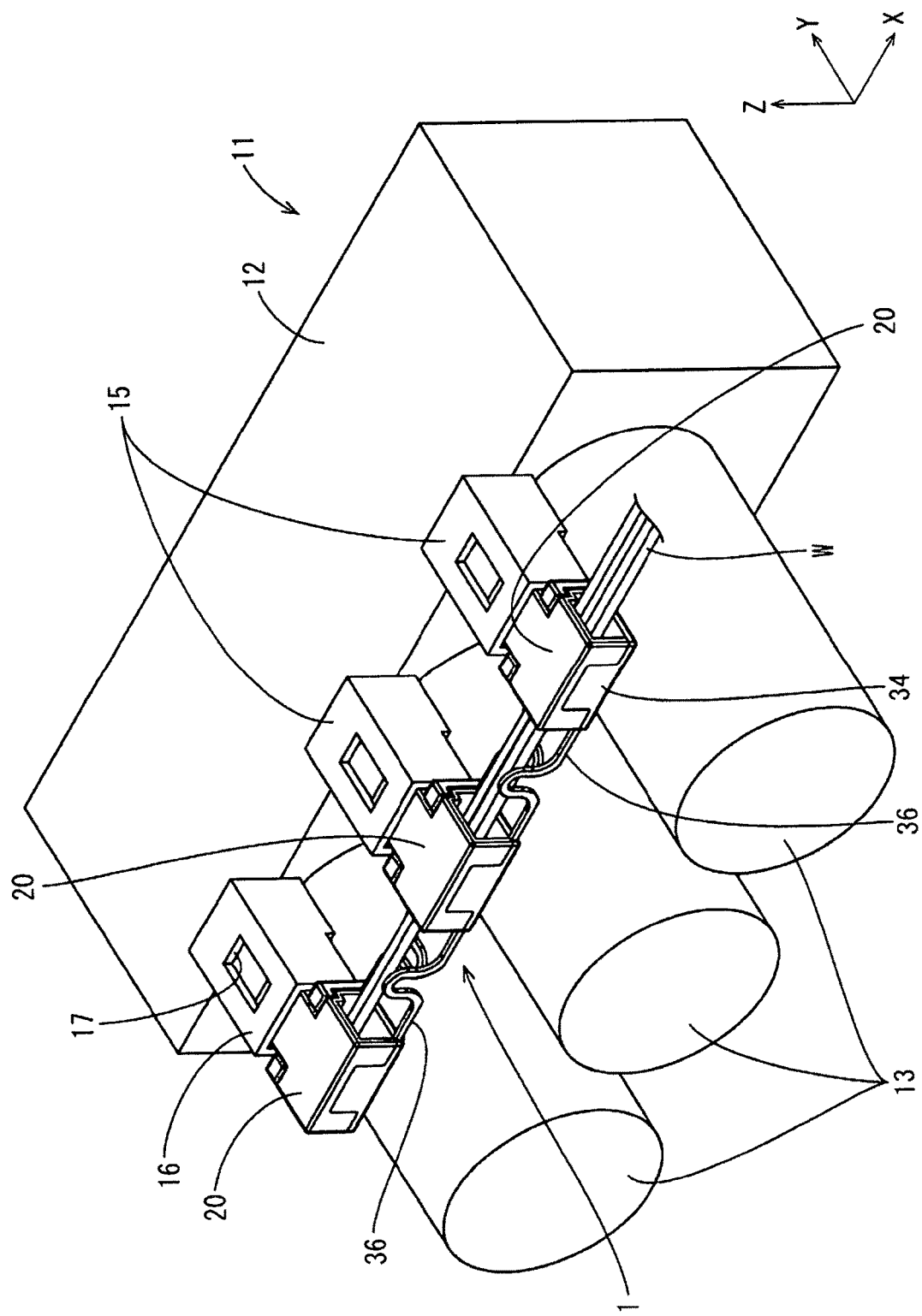
FIG. 1 is a back side perspective view showing a connector holding structure of a first embodiment connected to device-side connectors.
Figure 2:
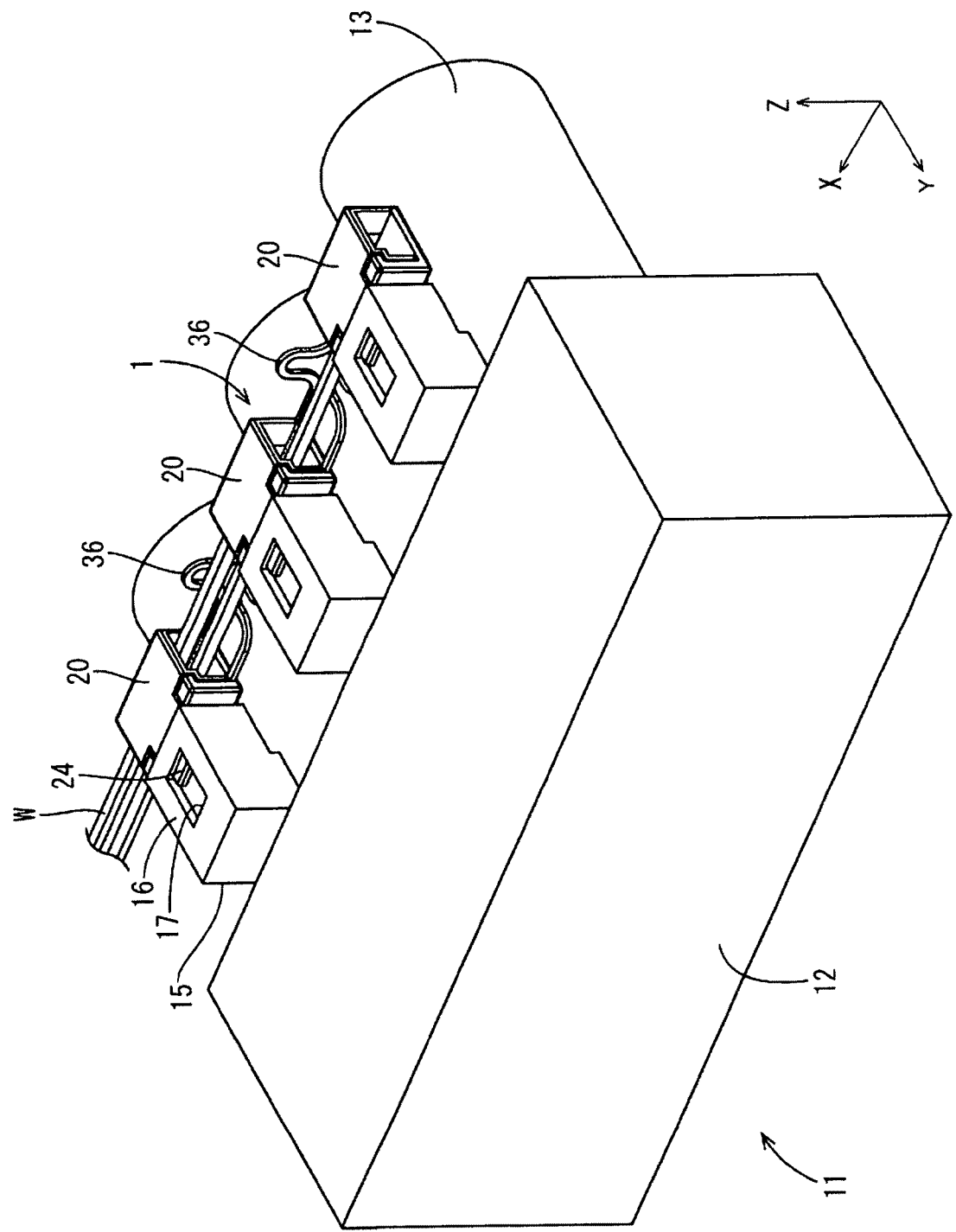
FIG. 2 is a front side perspective view likewise showing the connector holding structure connected to the device-side connectors.
Figure 3:
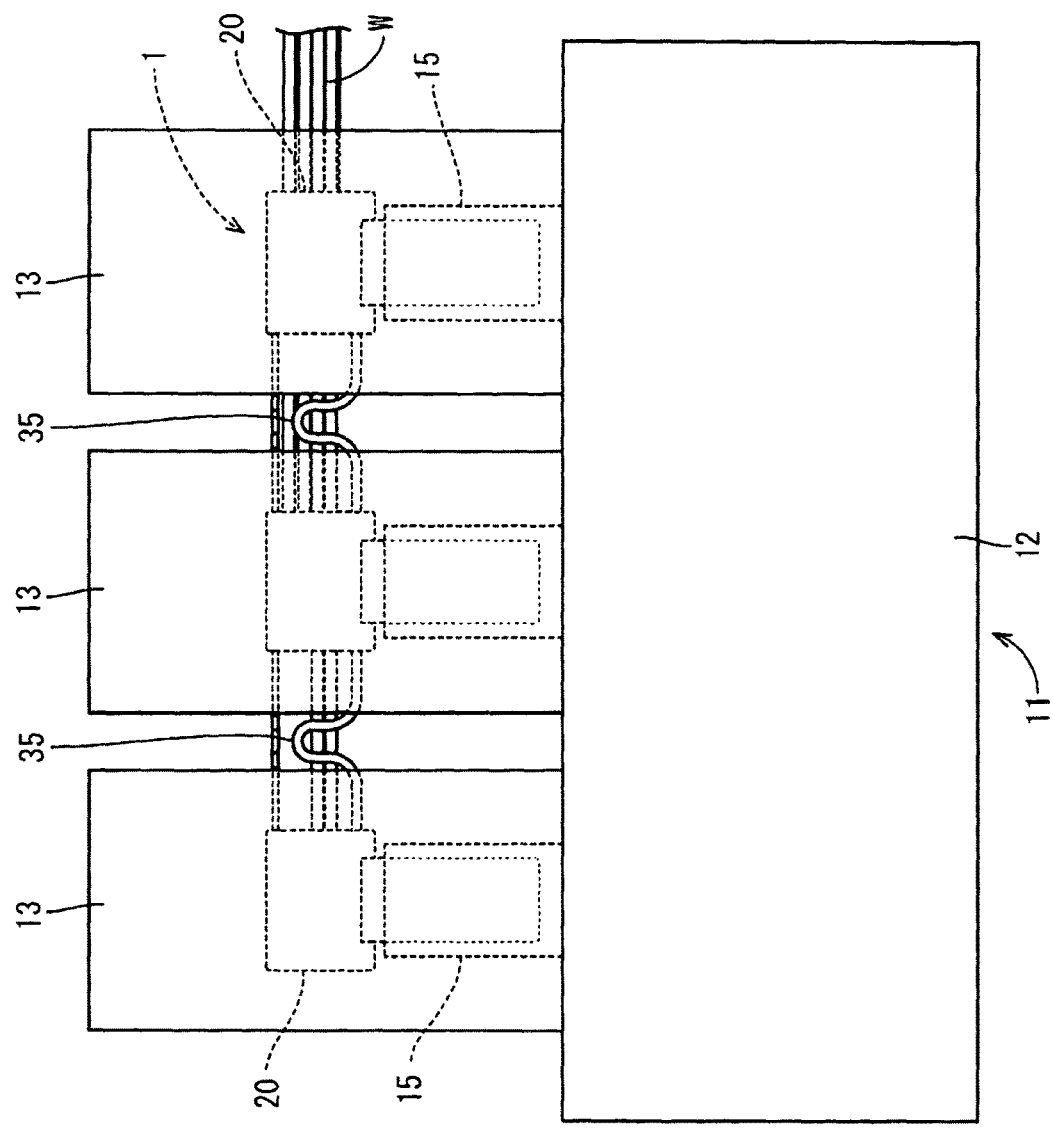
FIG. 3 is a bottom view likewise showing the connector holding structure connected to the device-side connectors.
Figure 4:
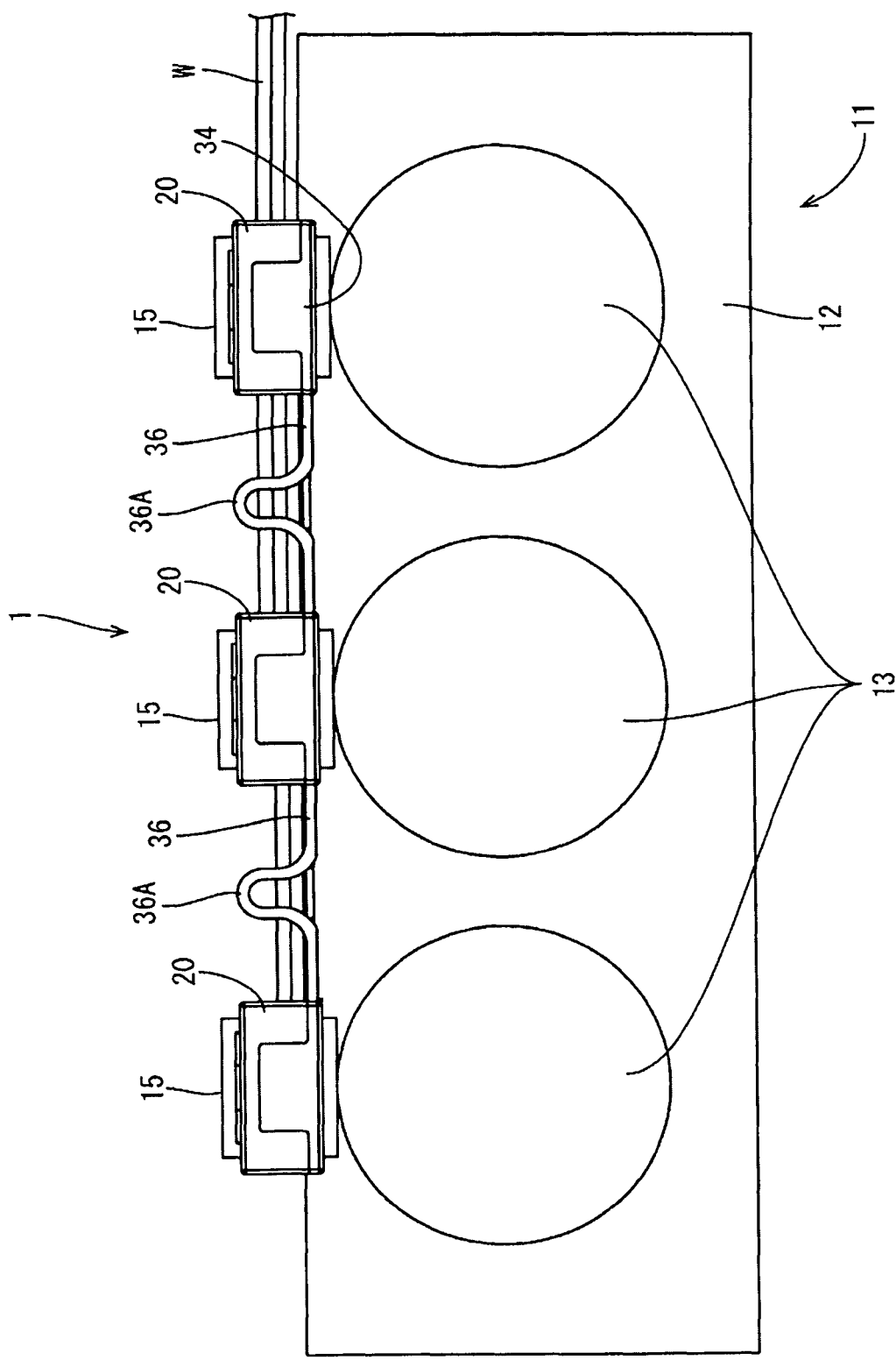
FIG. 4 is a back view likewise showing the connector holding structure connected to the device-side connectors.

A first embodiment is described with reference to FIGS. 1 to 16. A connector holding structure 1 of this embodiment is configured for holding wire-side connectors 20 (an example of connectors) to be connected to device-side connectors 15 (an example of mating connectors) provided on solenoid valves 13 constituting an automatic transmission 11 of an automotive vehicle. In the following description, an X direction is referred to as a rightward direction and an arrangement direction, a Y direction is referred to as a forward direction and a connecting direction, and a Z direction is referred to as an upward direction (direction intersecting both the arrangement direction and the connecting direction). Further, for identical members, only some members may be denoted by reference signs and other members may not be denoted by reference sings.

(Automatic Transmission 11)

For example, as shown in FIG. 1, the automatic transmission 11 includes a valve body 12 having a rectangular parallelepiped shape, and solenoid valves 13 are mounted laterally side by side in a row on the valve body 12. The solenoid valve 13 has a cylindrical shape and is integrally mounted on the valve body 12 with one end side inserted in a side surface of the valve body 12.

The device-side connectors 15 (an example of mating connectors) are provided on the upper surfaces of the respective solenoid valves 13. The device-side connector 15 has a rectangular parallelepiped shape as a whole, and the lower surface of a front side (Y direction) thereof is coupled to the curved upper surface of the solenoid valve 13.

The device-side connector 15 includes a receptacle 16 open in a projecting direction of the solenoid valve 13 from the valve body 12 (rearward) and male terminals (not shown) projecting into the receptacle 16 and to be connected to female terminals (not shown) of the wire-side connector 20. Further, a rectangular lock hole 17 is provided in an upper wall of the receptacle 16, and a lock protrusion 24 of the wire-side connector 20 to be described later can be engaged with the lock hole 17 for locking.

(Wire-Side Connectors 20)

Figure 5:
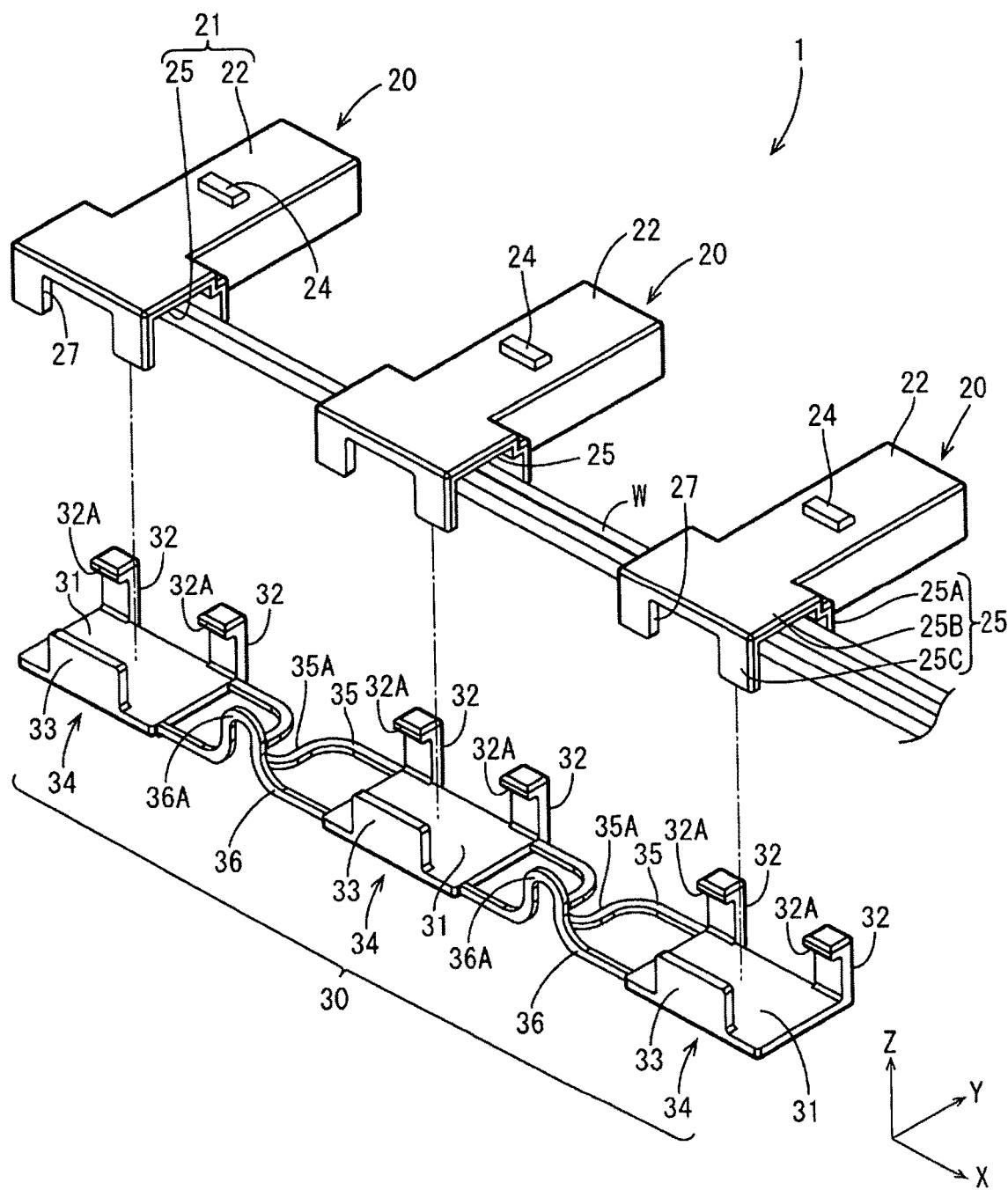
FIG. 5 is an exploded back side perspective view showing the connector holding structure.
Figure 6:
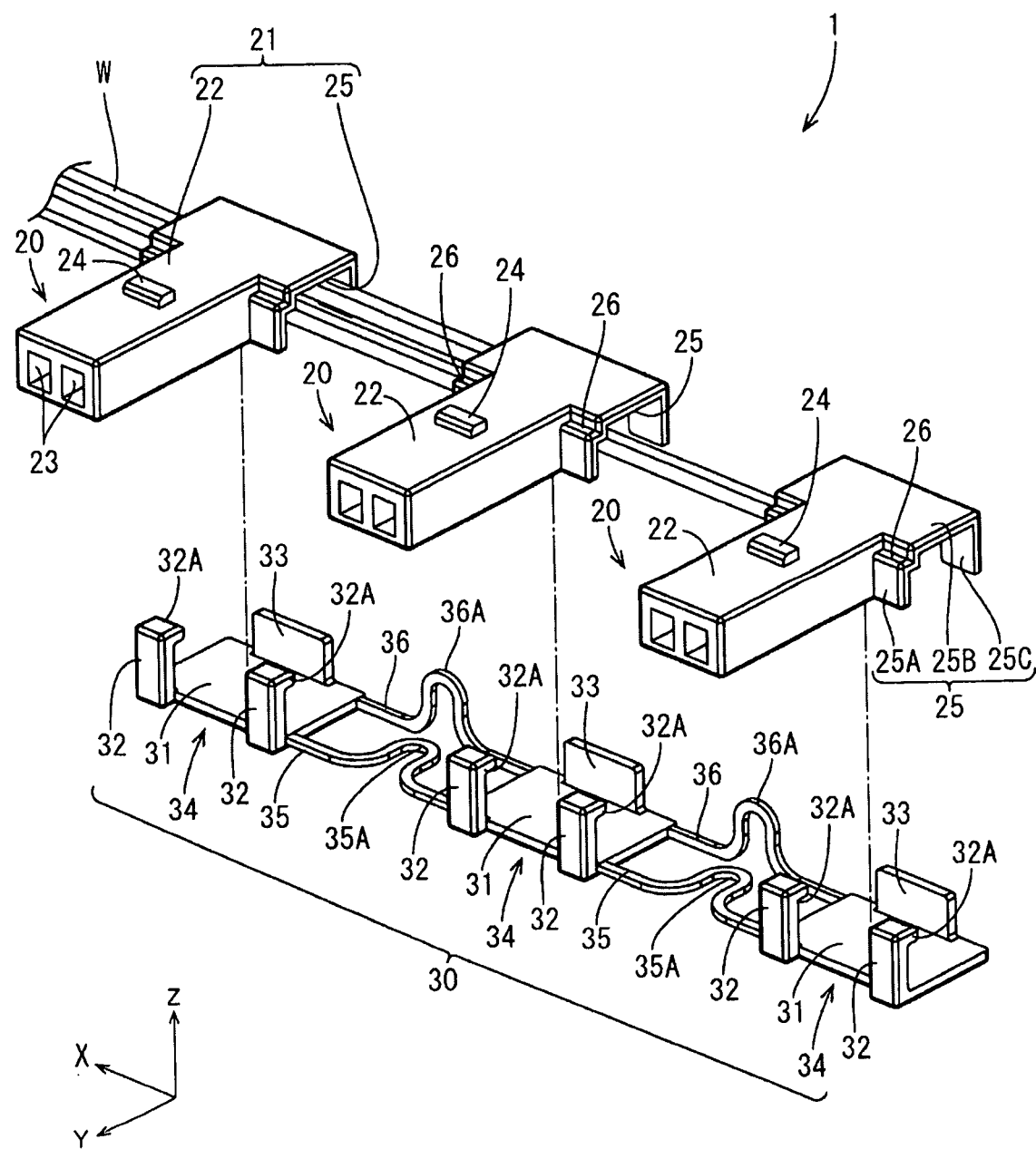
FIG. 6 is an exploded front side perspective view showing the connector holding structure.
Figure 7:
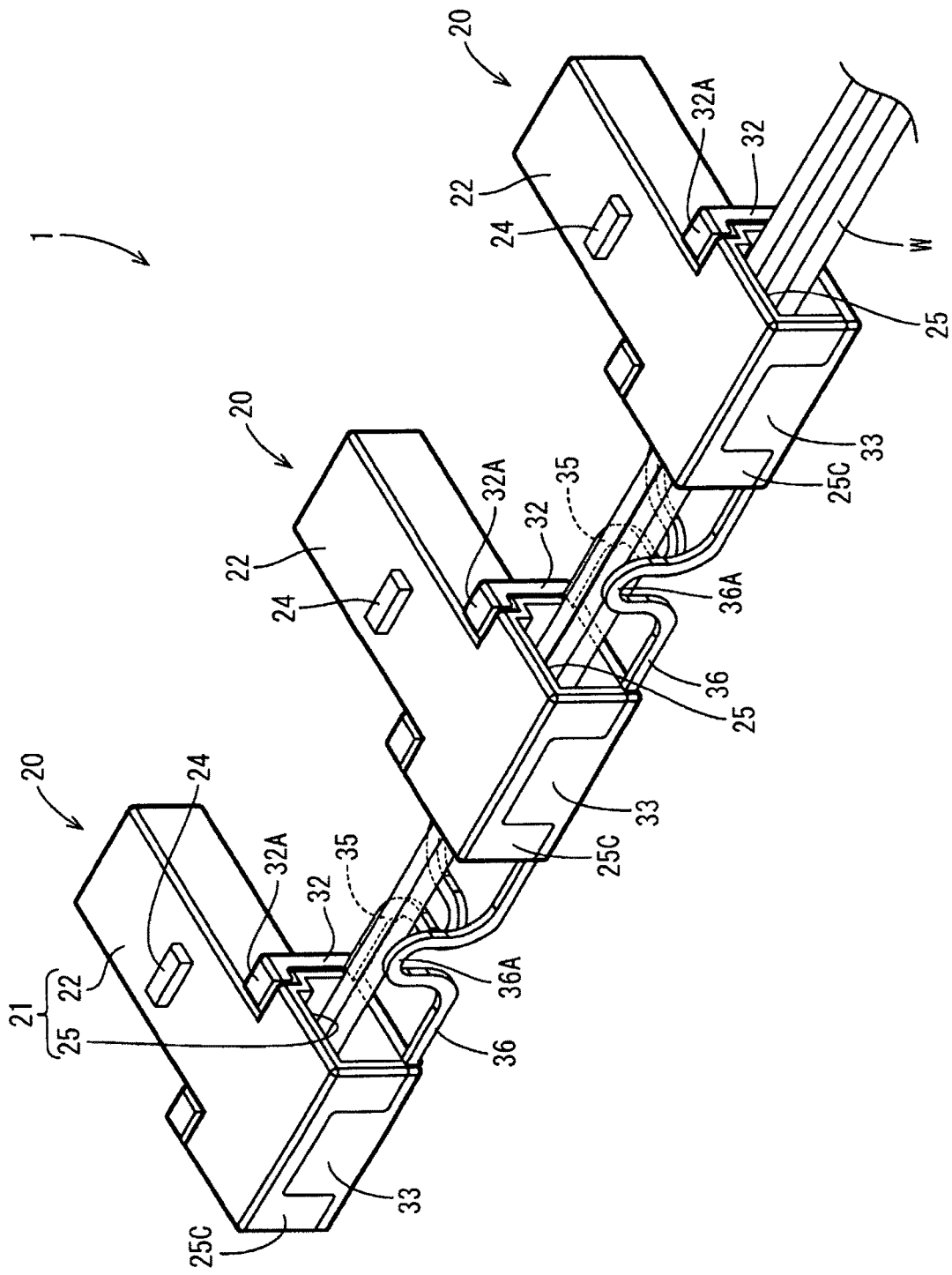
FIG. 7 is a back side perspective view showing the connector holding structure.
Figure 8:
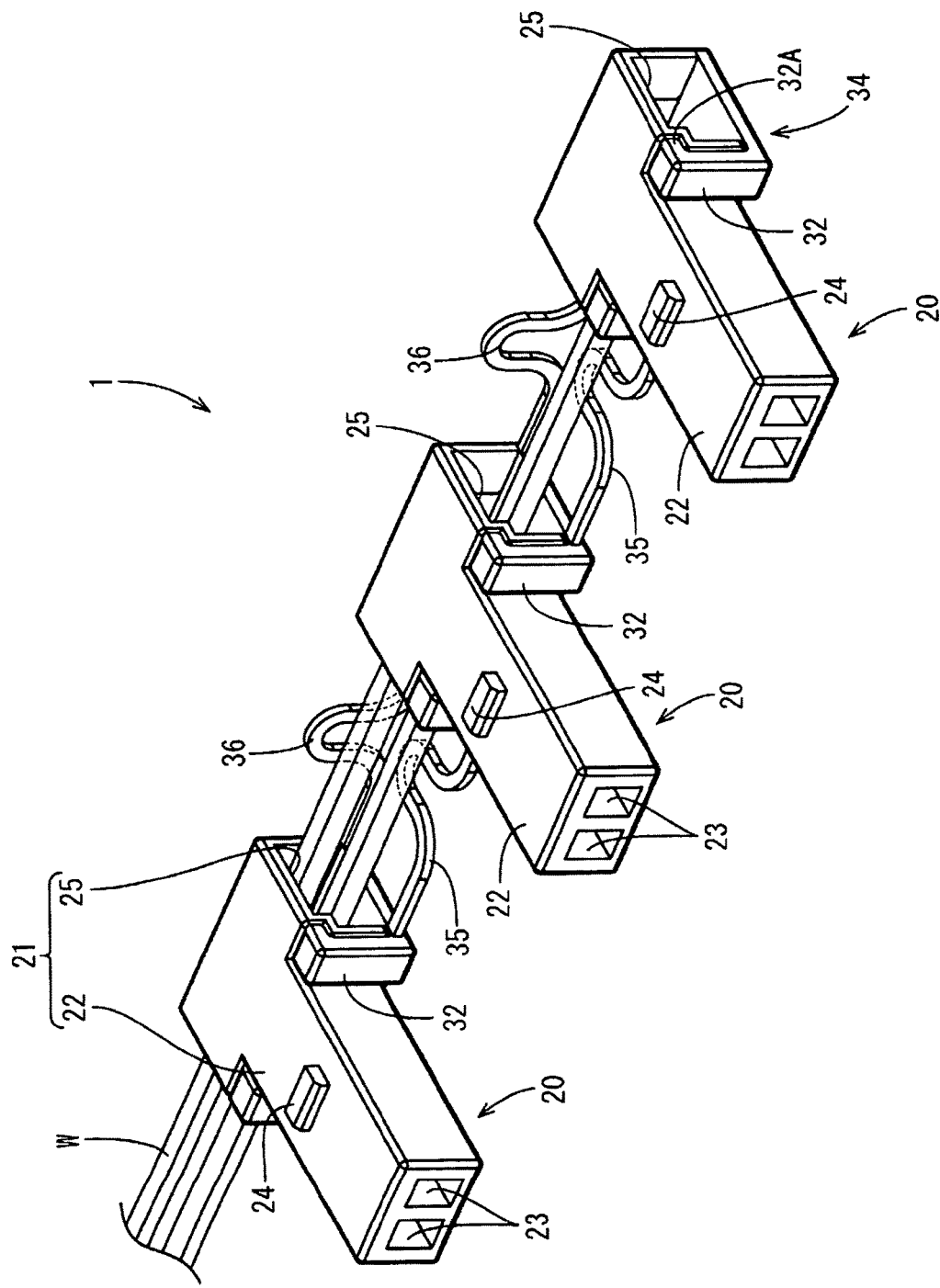
FIG. 8 is a front side perspective view showing the connector holding structure.

The wire-side connector 20 includes a housing 21 connectable to the device-side connector 15. The housing 21 is made of synthetic resin and includes, as shown in FIGS. 5 and 6, a housing body 22 having a rectangular parallelepiped shape and a wiring groove 25 connected behind the housing body 22 for surrounding and accommodating a plurality of wires W pulled out rearwardly of the housing body 11 between a lid portion 31 of a connector holding member 30 to be described later and the wiring groove 25.

The housing body 22 is dimensioned to fit into the receptacle 16 of the device-side connector 15, and internally is provided with two cavities 23 extending in a front-rear direction and capable of accommodating the unillustrated female terminals inserted from behind. Further, the lock protrusion 24 engageable with the aforementioned lock hole 17 for locking in a state connected to the device-side connector 15 is provided to project upward on the upper surface of the housing body 22.

The wiring groove 25 protrudes laterally from the upper wall of the housing body 11, extends rearward (serving as an upper wall 25B) and is bent downward (serving as a rear wall 25C). The front end of a part of the wiring groove 25 protruding laterally from the housing body 22 extends down and forward in a step-like manner (serving as a front wall 25A), and horizontally extending steps serve as locked portions 26 to be locked by locking pieces 32 of the connector holding member 30 to be described later (FIG. 6).

Further, a rectangular cut is formed to extend upward from a lower end edge in a central part of the rear wall 25C of the wiring groove 25 in a width direction (lateral direction) (see FIG. 5) and serves as an escaping portion 27 for avoiding interference in inserting the female terminals into the cavities 23.

(Connector Holding Member 30)

As shown in FIGS. 5 and 6, the connector holding member 30 of this embodiment includes plate-like lids 31 for individually closing openings open downward of the wiring grooves 25 of the respective housings 21 from below, resiliently deformable locking pieces 32 extending up from both end parts of the front end of each lid 31, and closing portions 33 likewise extending up from a central part of the rear end of each lid 31.

Locking claws 32A projecting rearward are formed on the tips of the pair of locking pieces 32, and the locking claws 32A lock the locked portions 26 when the opening of the wiring groove 25 of the housing 21 is closed by the lid 31.

Further, the closing portion 33 is dimensioned to tightly close the escaping portion 27 when an opening end of the wiring groove 25 of the housing 21 is closed by the lid 31.

The lid 31, locking pieces 32 and closing portion 33 function as a connector mounting portion 34 for holding the wire-side connector 20. Specifically, the wire-side connector 20 is held at a part of the wiring groove 25 by the connector holding member 30.

Furthermore, adjacent lids 31 (connector mounting portions 34) are coupled by deflectable and deformable first and second flexible portions 35, 36.

The first flexible portion 35 couples front end parts of side edges of adjacent lids 31 facing each other, and a central part thereof is curved into a convex shape projecting rearward (hereinafter, the curved part is referred as a first curved portion 35A). In other words, the first flexible portion 35 is curved on a horizontal plane (X-Y plane) along the lids 31. The first flexible portion 35 is relatively easily deflected and deformed in the plane (X-Y plane) along an arrangement direction (X direction) of the plurality of wire-side connectors 20 and a connecting direction (Y direction) to the device-side connectors 15.

On the other hand, the second flexible portion 36 couples rear end parts of side edges of adjacent lids 31 facing each other, and a central part thereof is curved into a convex shape projecting up (hereinafter, the curved part is referred as a second curved portion 36A). In other words, the second flexible portion 36 is curved on a vertical plane (X-Z plane) perpendicular to the lids 31. A rising height of the second curved portion 36A is equal to a height of the wire-side connectors 20 (see FIG. 9). The second flexible portion 36 is relatively easily deflected and deformed in the plane (X-Z plane) along a direction (Z direction) intersecting both the arrangement direction (X direction) and the connecting direction (Y direction) and the arrangement direction (X direction).

The first and second flexible portions 35, 36 are made of elongated rectangular bars and deflected and deformed in any direction although ease of deformation has directionality.

The connector holding structure 1 of this embodiment is as described above. Next, an assembling procedure is described.

First, the female terminals (not shown) connected to the wires W are accommodated into the cavities 23 from behind, the wires W pulled out rearward from the cavities 23 are bent laterally and pulled out from the wiring groove 25 in the lateral direction (arrangement direction of the wire-side connectors 20, X direction) (see FIGS. 5 and 6). After a predetermined number of (two in this embodiment) female terminals are accommodated into each housing 21, the opening of the wiring groove 25 of each housing 21 is placed on the lid 31 of the connector holding member 30.

Then, the opening of the wiring groove 25 is closed by the lid 31, and the closing portion 33 enters to slide on an opening edge part of the escaping portion 27, thereby closing the escaping portion 27. At this time, the locking pieces 32 move relatively upward while being resiliently deformed to escape outward, and resiliently return when reaching the step-like locked portions 26 so that the locking claws 32A lock the locked portions 26. In this way, the wire-side connector 20 is integrally held on the connector holding member 30 (connector mounting portion 34) (see FIGS. 7 and 8).

In this state, the wire-side connectors 20 are held at predetermined intervals and side by side in a row in the arrangement direction in proper connection postures by the connector holding member 30. Further, the wires W pulled out from the respective wire-side connectors 20 are accommodated in spaces enclosed by the wiring grooves 25 and the lids 31 and routed along the arrangement direction (X direction) of the wire-side connectors 20.

Figure 9:
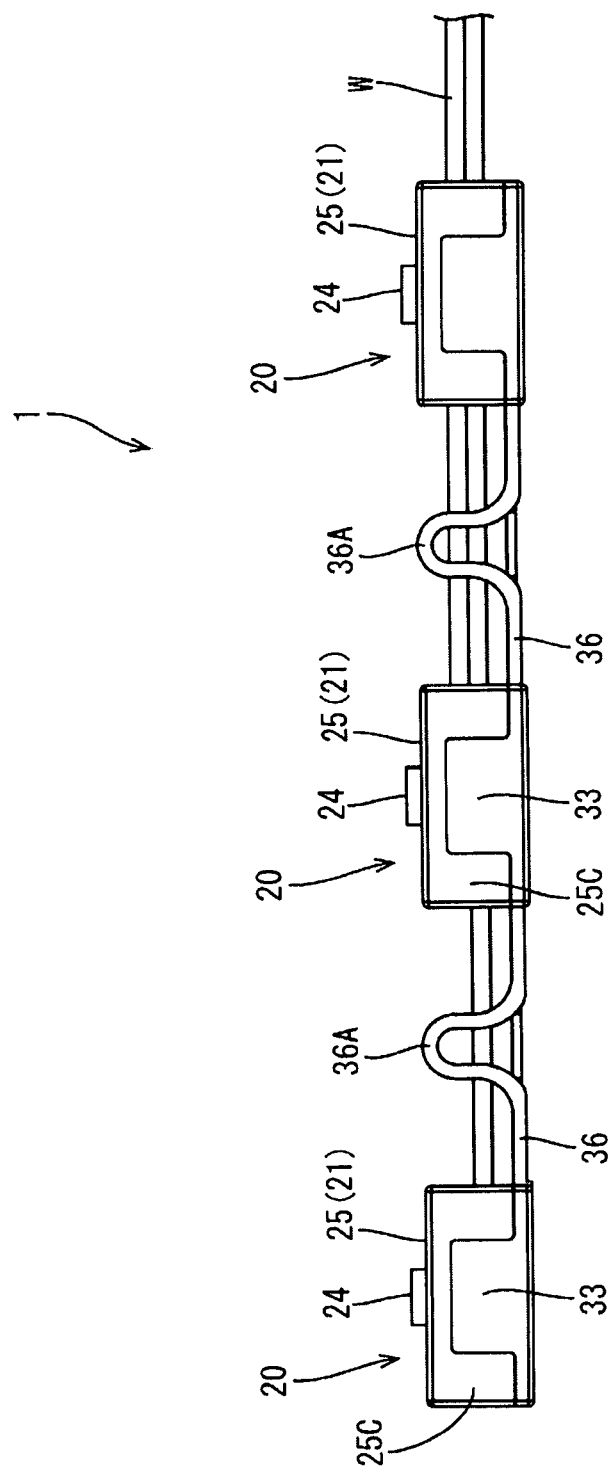
FIG. 9 is a back view showing the connector holding structure.
Figure 10:
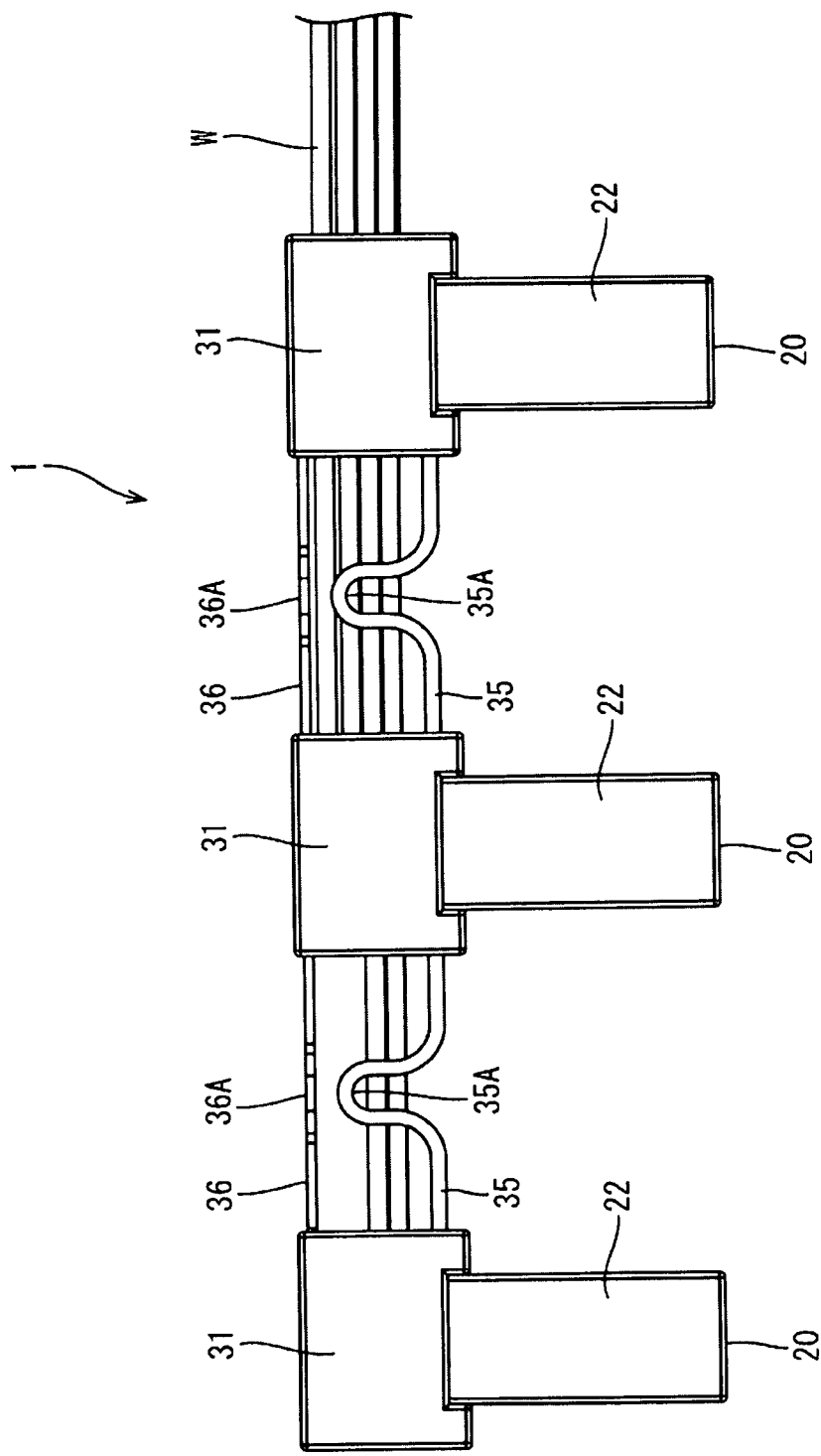
FIG. 10 is a bottom view showing the connector holding structure.
Figure 11:
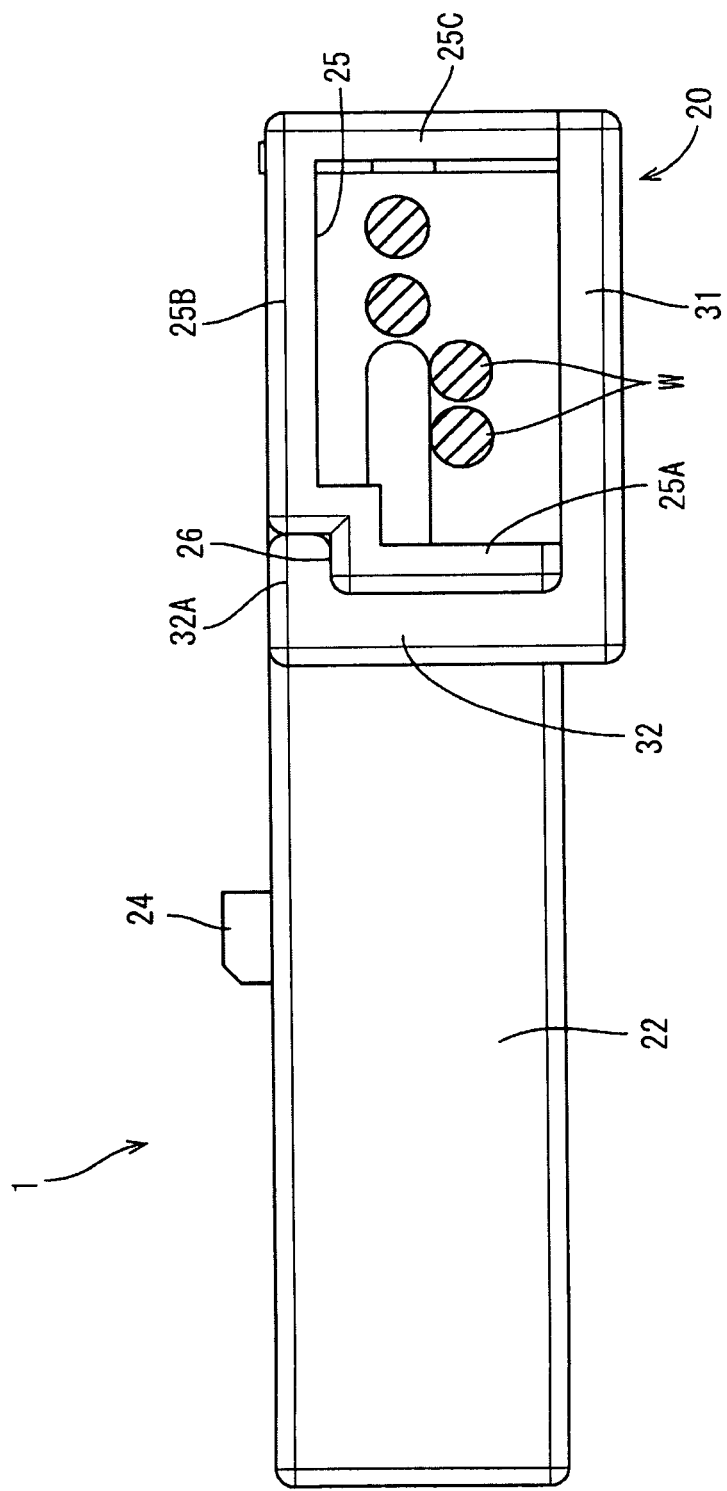
FIG. 11 is a side view showing the connector holding structure.
Figure 12:
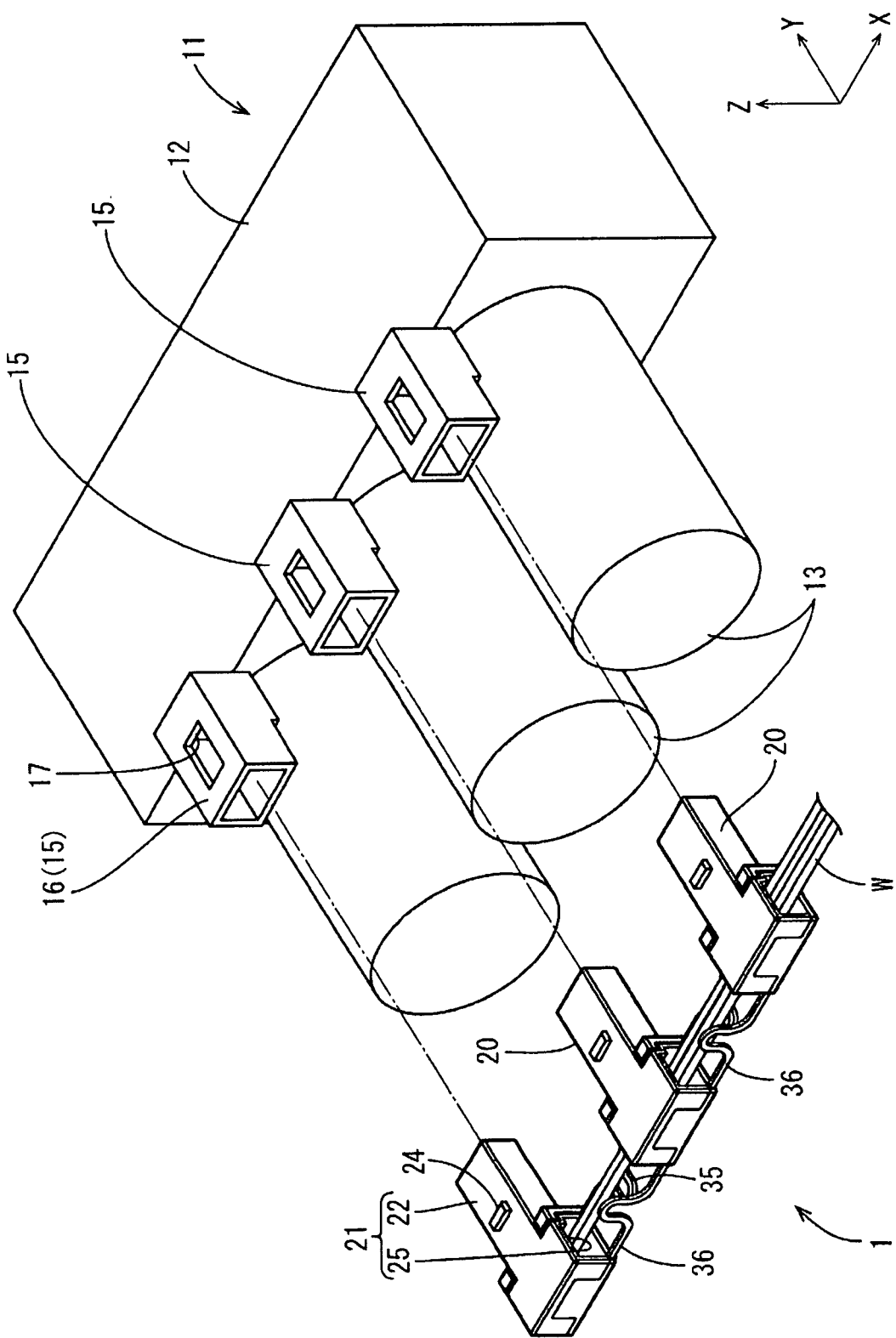
FIG. 12 is a back side perspective view showing a state before being connected to the device-side connectors.

Further, in this state, the first flexible portions 35 are disposed below the wires W (see FIG. 10), the second flexible portions 36 are disposed behind the wires W, and the upper ends of the second curved portions 36A project upward from the wires W (see FIG. 9).

Figure 13:
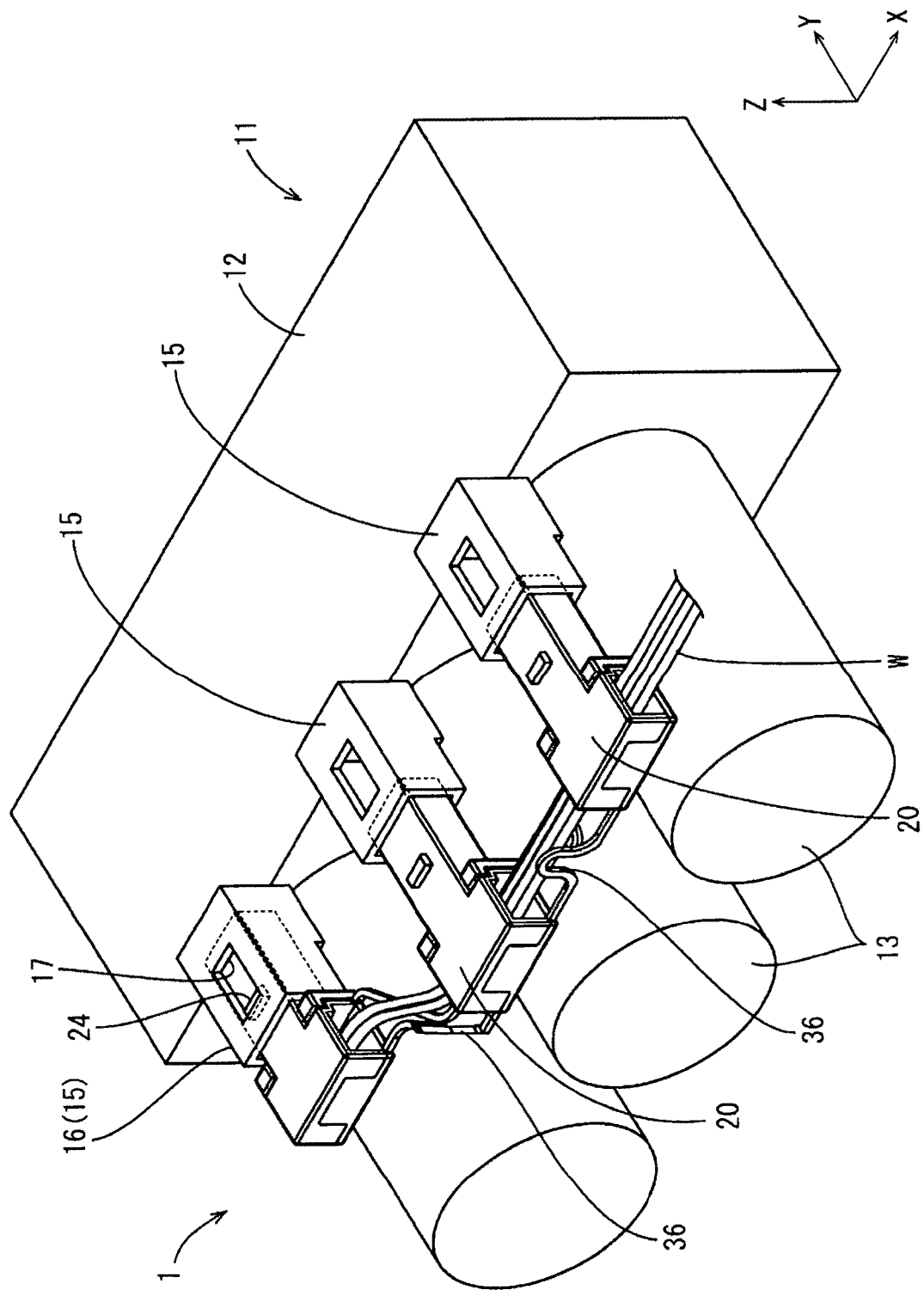
FIG. 13 is a back side perspective view showing a connection process to the device-side connectors.

Subsequently, the wire-side connectors 20 held by the connector holding member 30 are brought closer to the device-side connectors 15 and successively inserted into the receptacles 16 of the device-side connectors 15 from an end (see FIG. 13). In this connection process, adjacent wire-side connectors 20 are displaced in the front-rear direction (Y direction) from the proper arrangement direction (X direction). However, since the deflectable and deformable first and second flexible portions 35, 36 are provided between these wire-side connectors 20, a displacement is absorbed by these first and second flexible portions 35, 36.

Note that the displacement in the front-rear direction (Y direction) in this case is relatively easily absorbed by the first flexible portion 35, but can also be absorbed by the second flexible portion 36.

Figure 14:
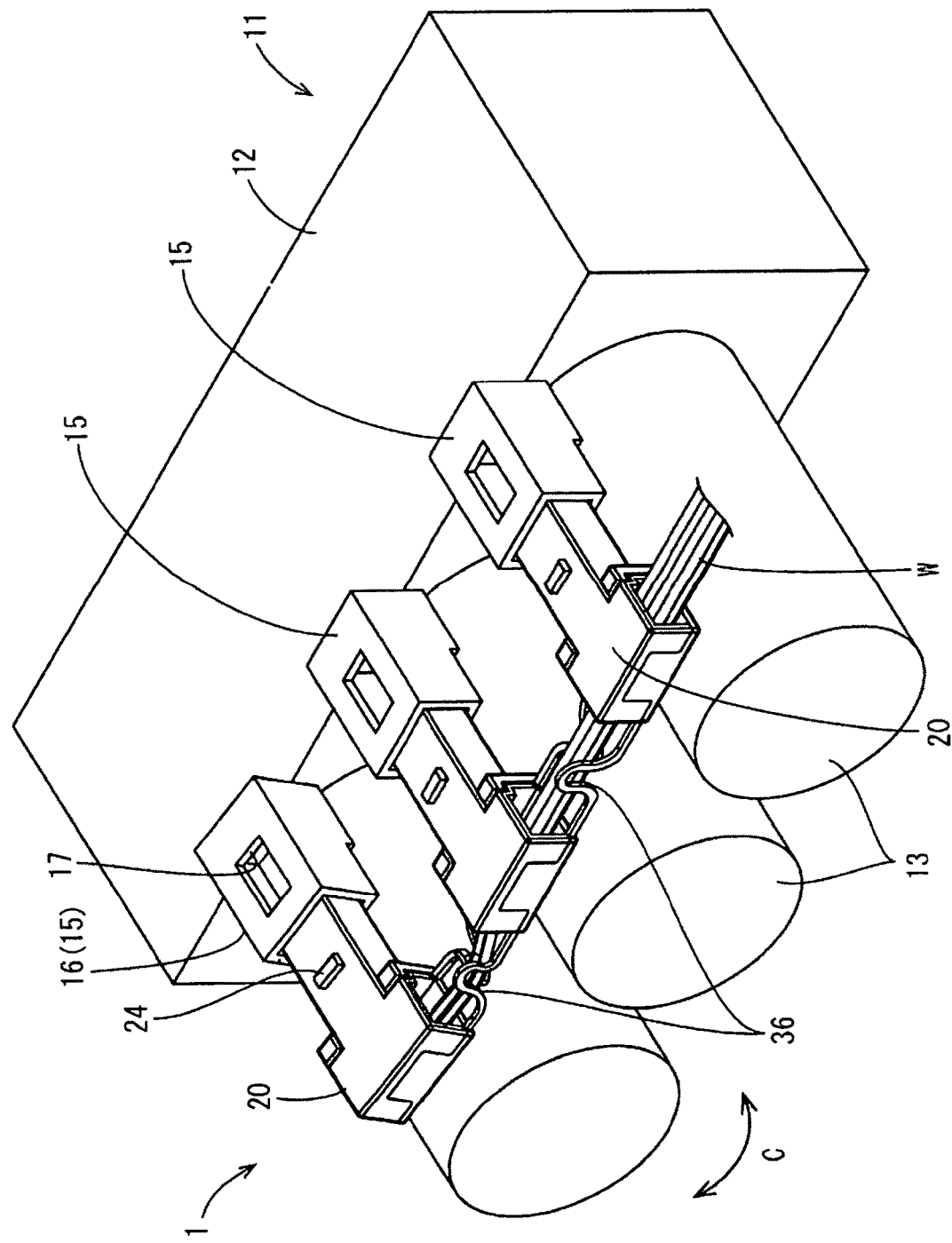
FIG. 14 is a back side perspective view showing a case where inclination has occurred in the connection process to the device-side connectors.
Figure 15:
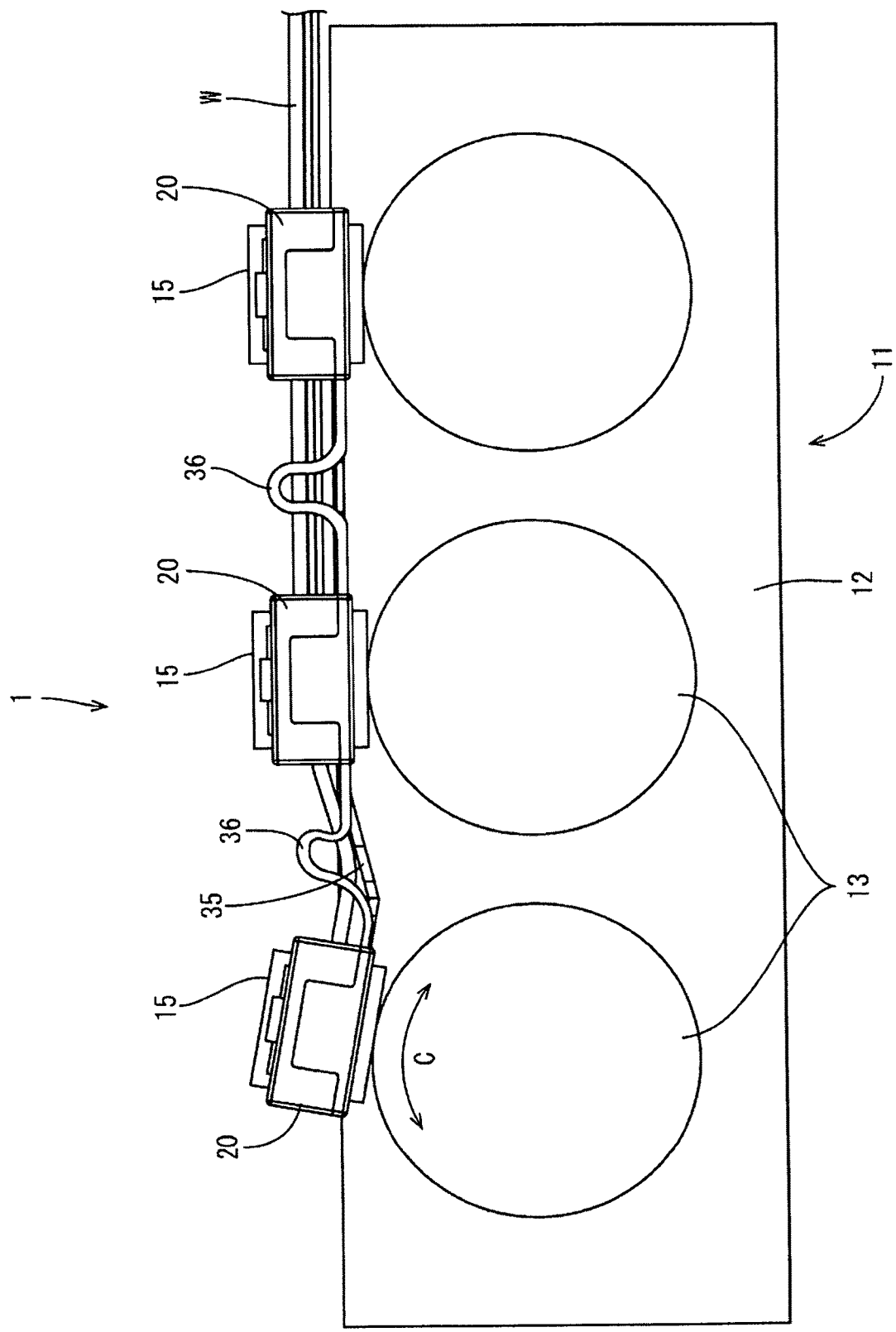
FIG. 15 is a back view showing the case where inclination has occurred in the connection process to the device-side connectors.
Figure 16:
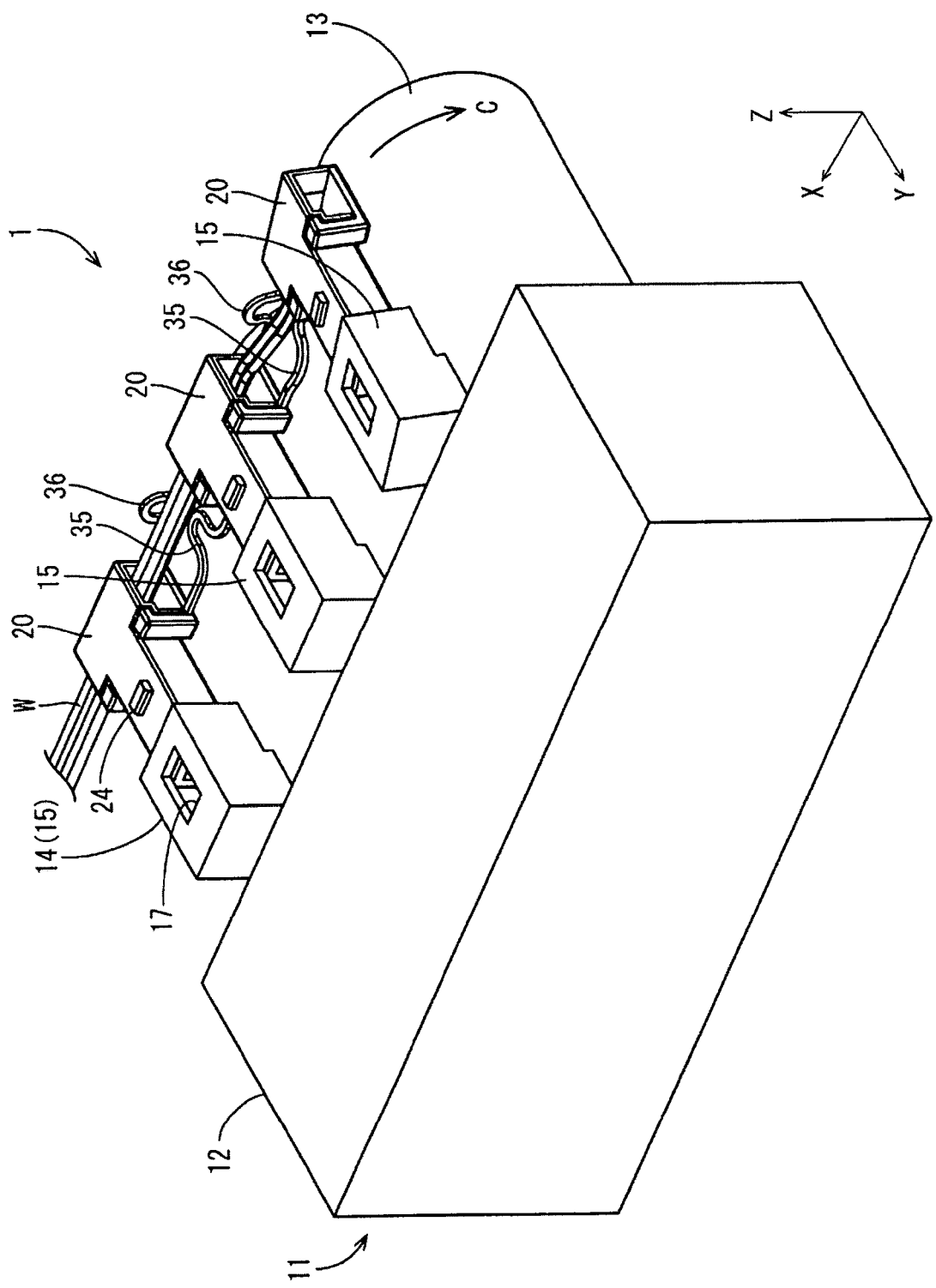
FIG. 16 is a front side perspective view showing the case where inclination has occurred in the connection process to the device-side connectors.
Figure 17:
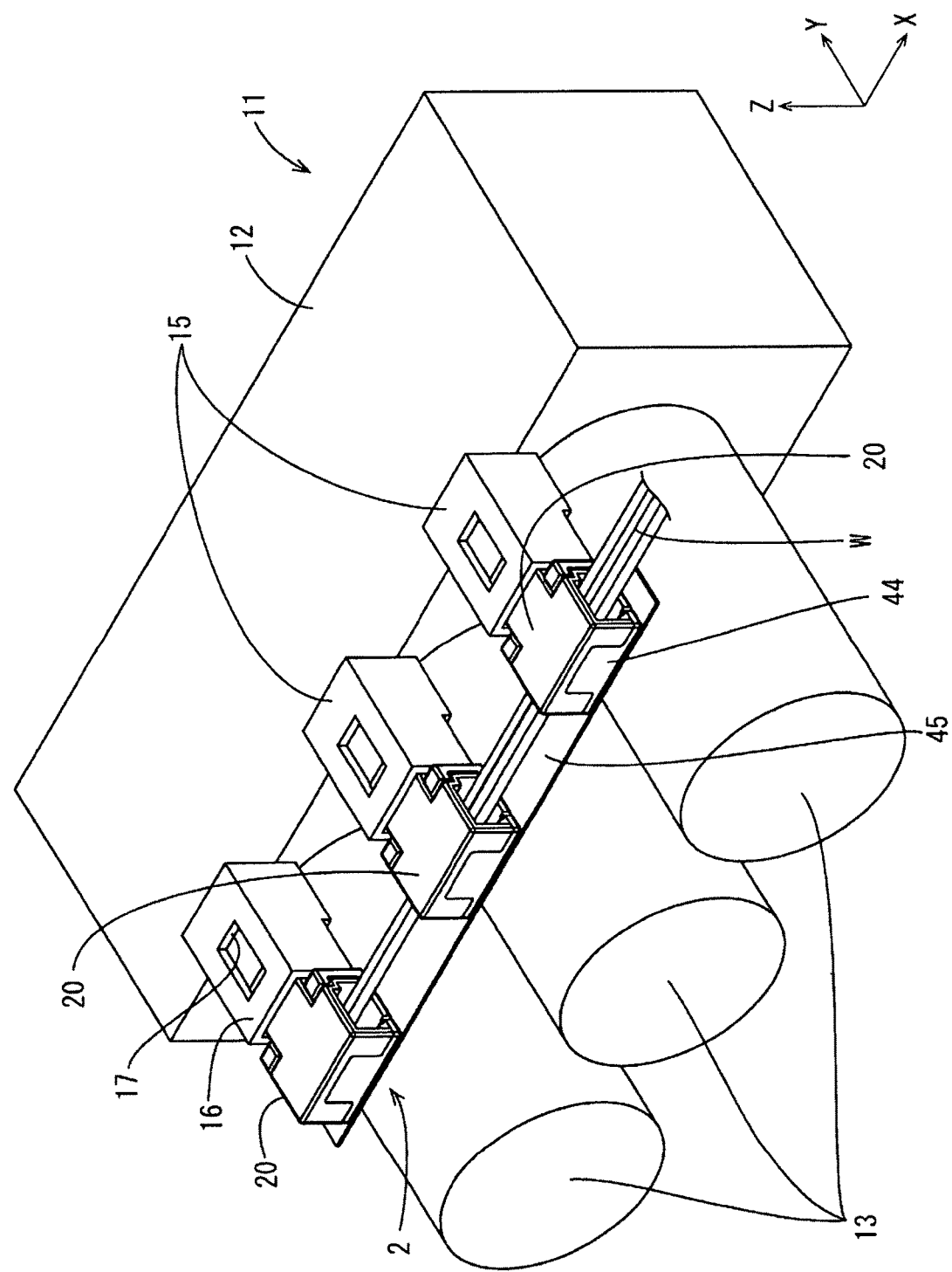
FIG. 17 is a back side perspective view showing a connector holding structure of a second embodiment connected to device-side connectors.
Figure 18:
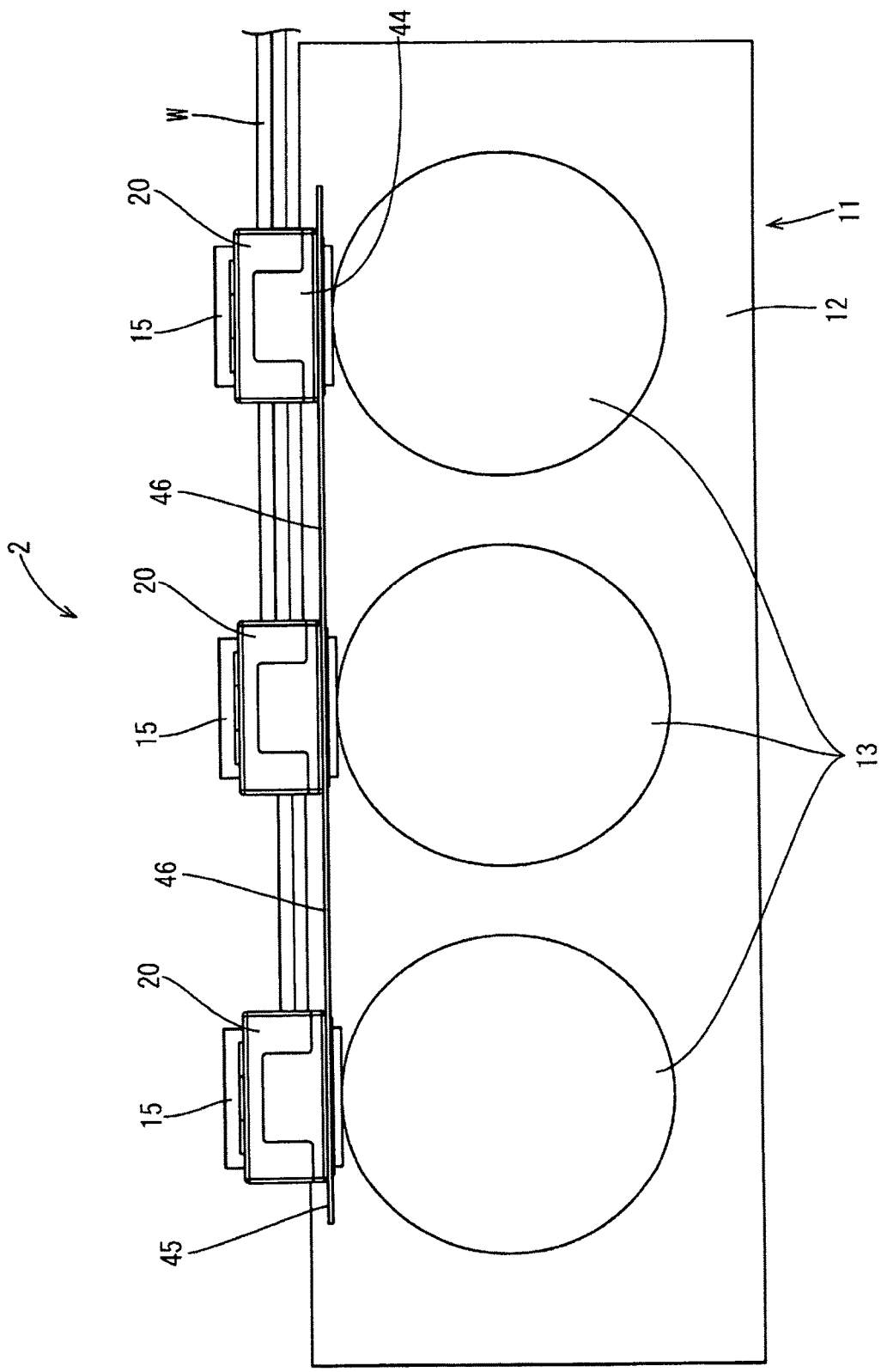
FIG. 18 is a back view likewise showing the connector holding structure connected to the device-side connectors.
Figure 19:
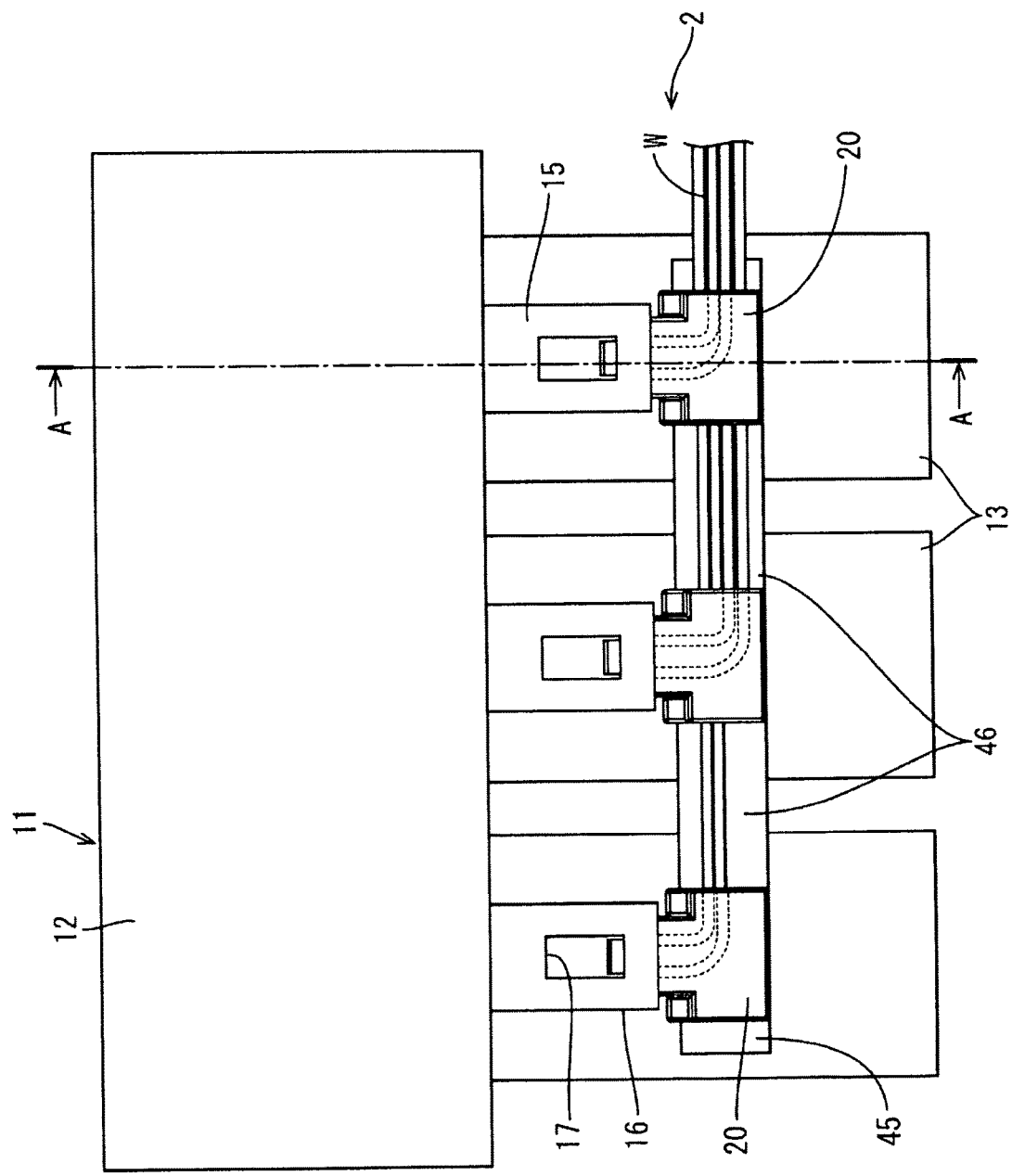
FIG. 19 is a plan view likewise showing the connector holding structure connected to the device-side connectors.
Figure 20:
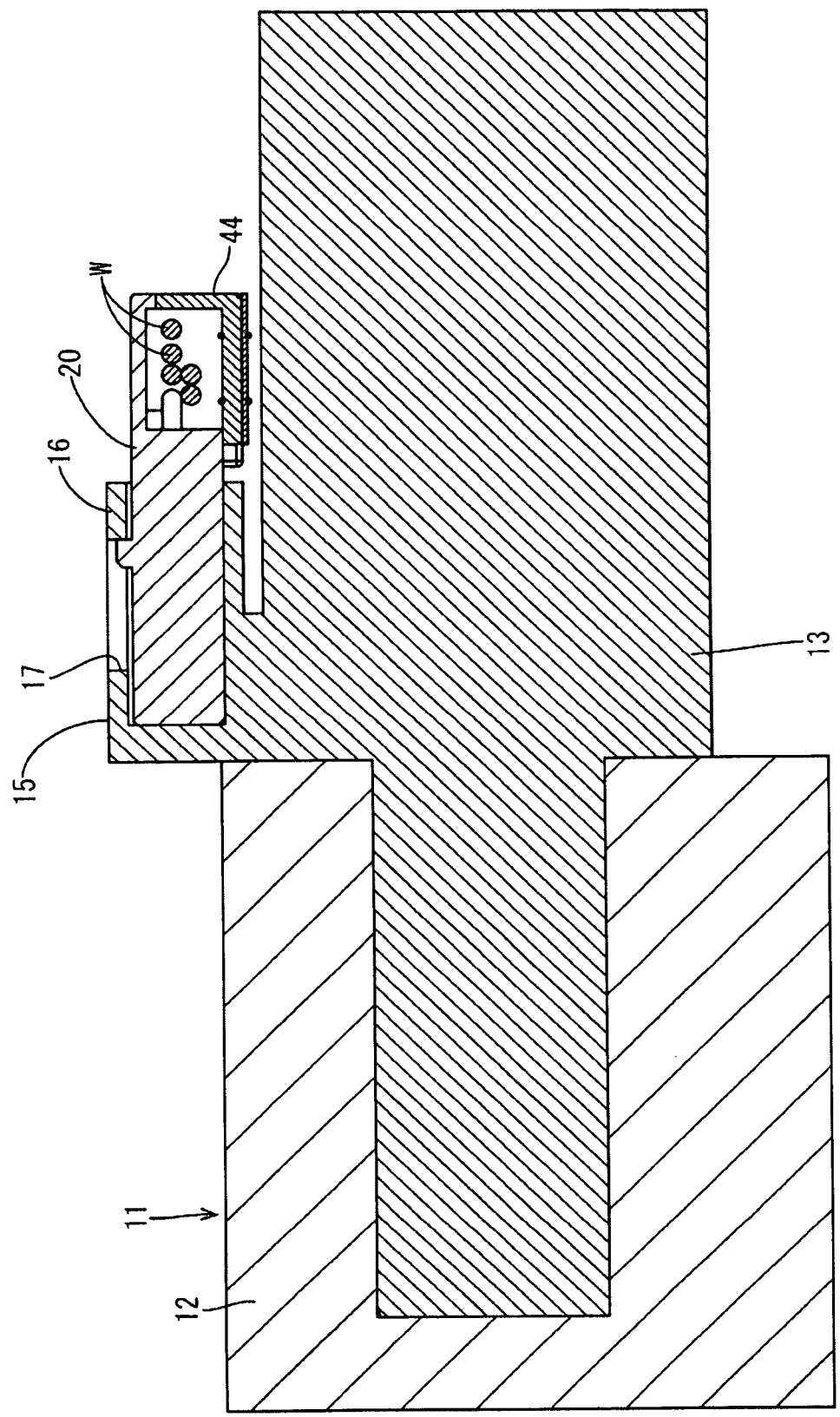
FIG. 20 is a section along A-A of FIG. 19.
Figure 21:
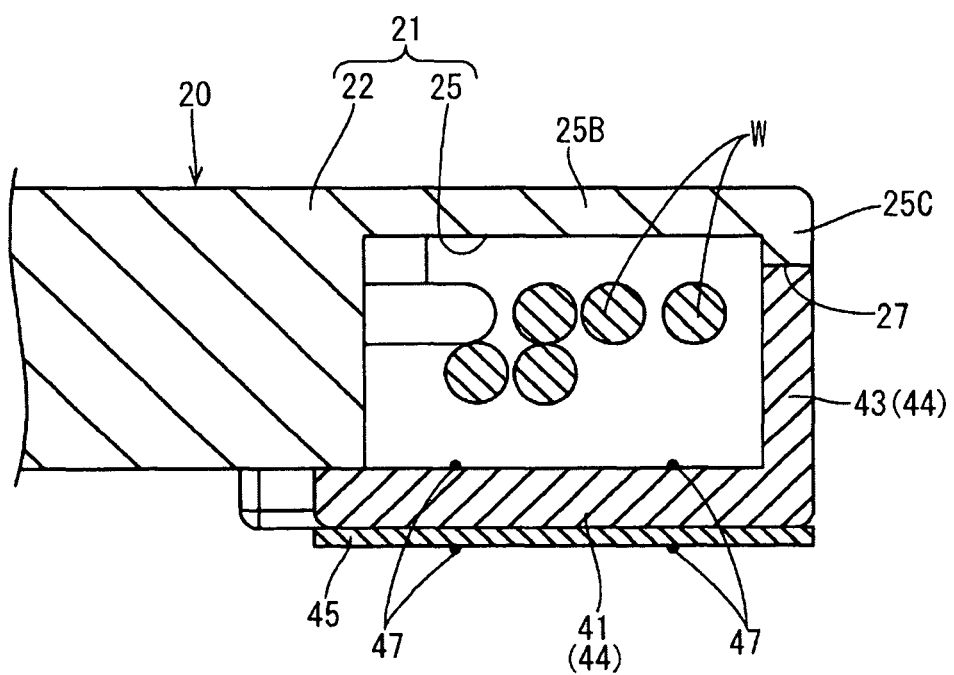
FIG. 21 is an enlarged section of an essential part of FIG. 20.
Figure 22:
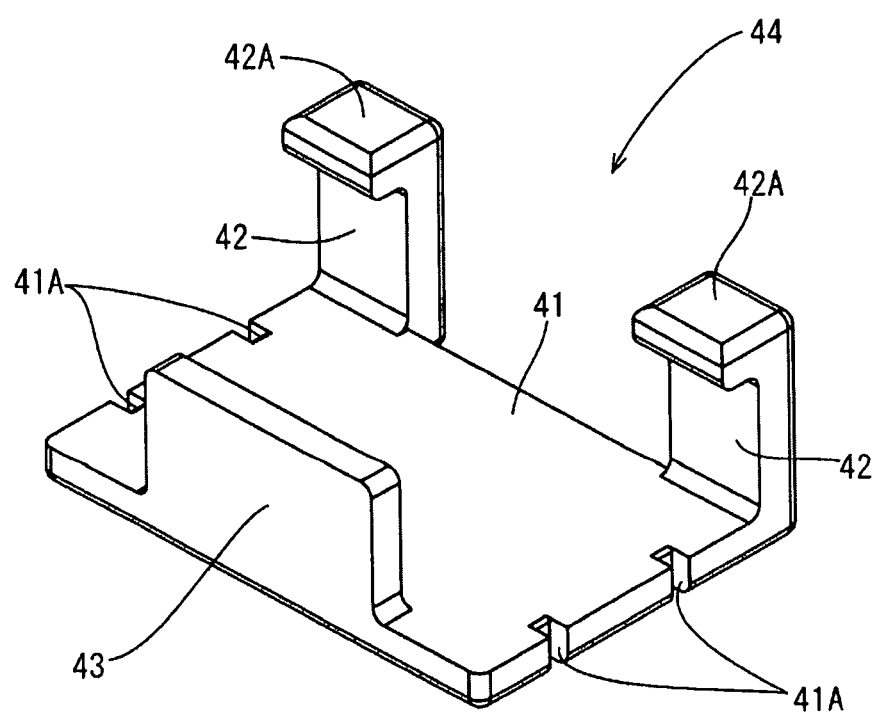
FIG. 22 is a perspective view of a connector mounting portion.
Figure 23:
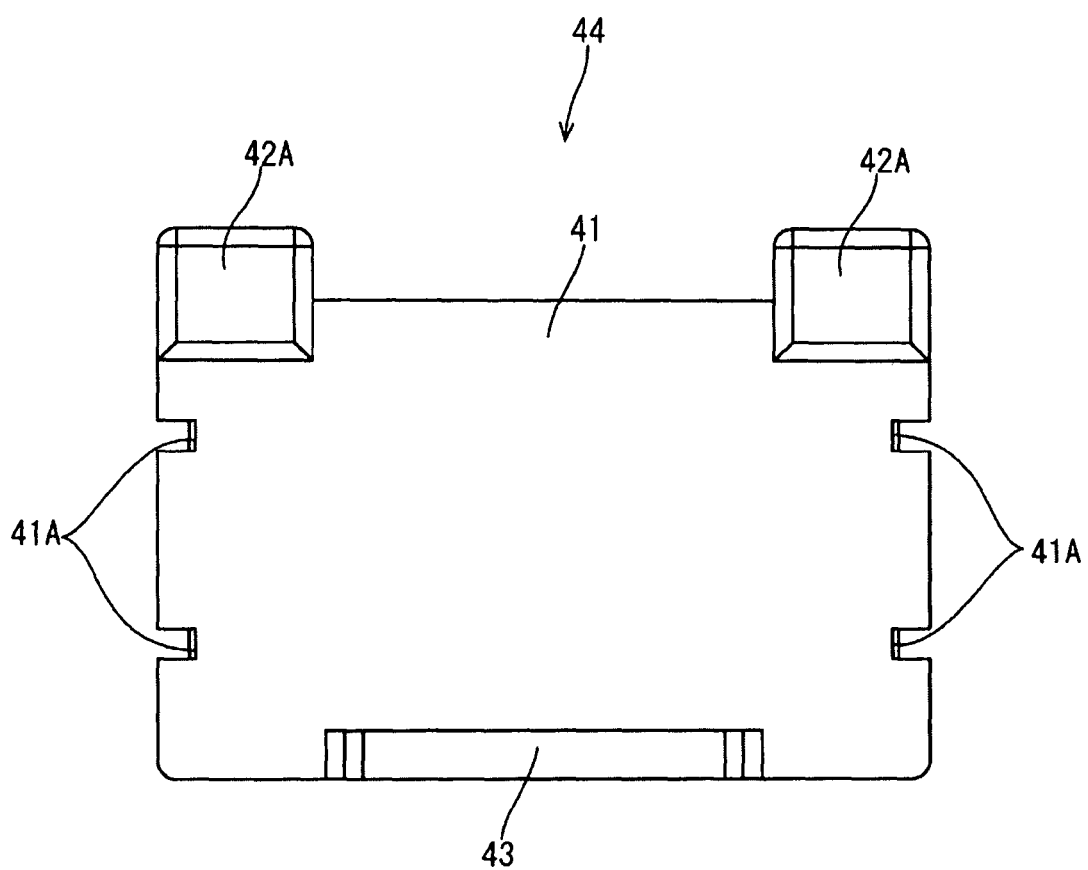
FIG. 23 is a plan view of the connector mounting portion.
Figure 24:
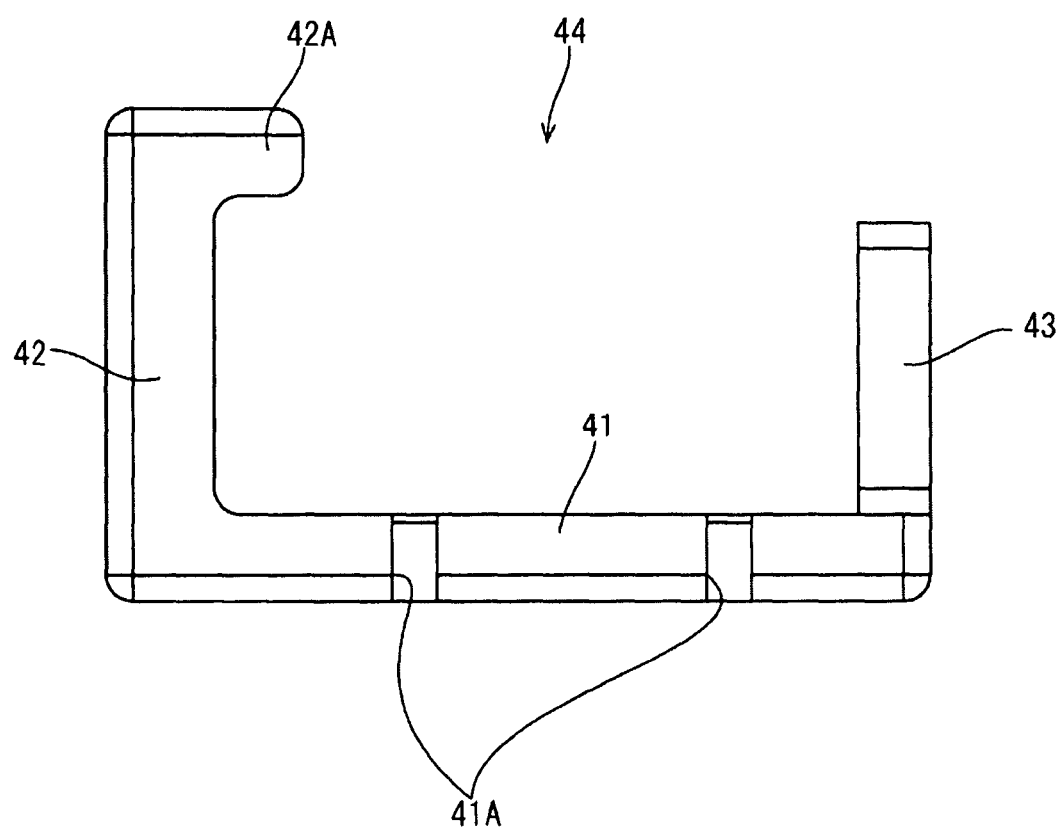
FIG. 24 is a side view of the connector mounting portion.

The device-side connector 15 of this embodiment is provided on the upper surface of the solenoid valve 13 as described above. Since the solenoid valve 13 has a cylindrical shape and one end side thereof is inserted into the valve body 12, the device-side connector 15 may be displaced in a circumferential direction C of the solenoid valve 13. FIGS. 14 to 16 show such a state.

The solenoid valve 13 on a left end in FIGS. 14 and 15 is somewhat rotated in a rightward direction in FIGS. 14 and 15. Thus, the device-side connector 15 is in such an inclined state that a right side in FIGS. 14 and 15 is lower. Even in such a case, the deflectable and deformable first and second flexible portions 35, 36 are provided between the adjacent wire-side connectors 20 so that inclination is absorbed by the first and second flexible portions 35, 36.

Note that the displacement in the vertical direction (Z direction) in this case is relatively easily absorbed by the second flexible portion 36, but can also be absorbed by the first flexible portion 35.

Next, functions and effects are described.

Since the wire-side connectors 20 are held collectively by the connector holding member 30 according to the connector holding structure 1 of this embodiment, the wire-side connectors 20 can be aligned stably in the arrangement direction (X direction) and brought closer to the device-side connectors 15 in nearly proper connection postures.

Further, the wire-side connector 20 is movable in the front-rear direction (Y direction) by deflecting the first and second flexible portions 35, 36 at the time of connection to the device-side connector 15, and inclination can be absorbed if the device-side connector 15 is inclined.

Specifically, work efficiency in connecting the plurality of wire-side connectors 20 to the device-side connectors 15 is improved.

Further, since the wire-side connectors 20 are provided integrally with the wiring grooves 25 for accommodating the wires W drawn out from the plurality of wire-side connectors 20 along the arrangement direction (X direction), the wires W can be routed collectively.

Further, since the opening of the wiring groove 25 is closed by the lid 31 of the connector holding member 30, it is not necessary to provide the wire-side connector 20 with a lid for closing the wiring groove 25 or separately provide a lid for closing the wiring groove 25 and the number of components can be reduced.

Second Embodiment

A second embodiment is described with reference to FIGS. 17 to 39. A connector holding structure 2 of this embodiment differs from that of the first embodiment in the configuration of a connector holding member 40. Since an automatic transmission 11 and wire-side connectors 20 are the same as those of the first embodiment, these are denoted by the same reference signs and repeated description is omitted.

(Connector Holding Member 40)

Figure 25:
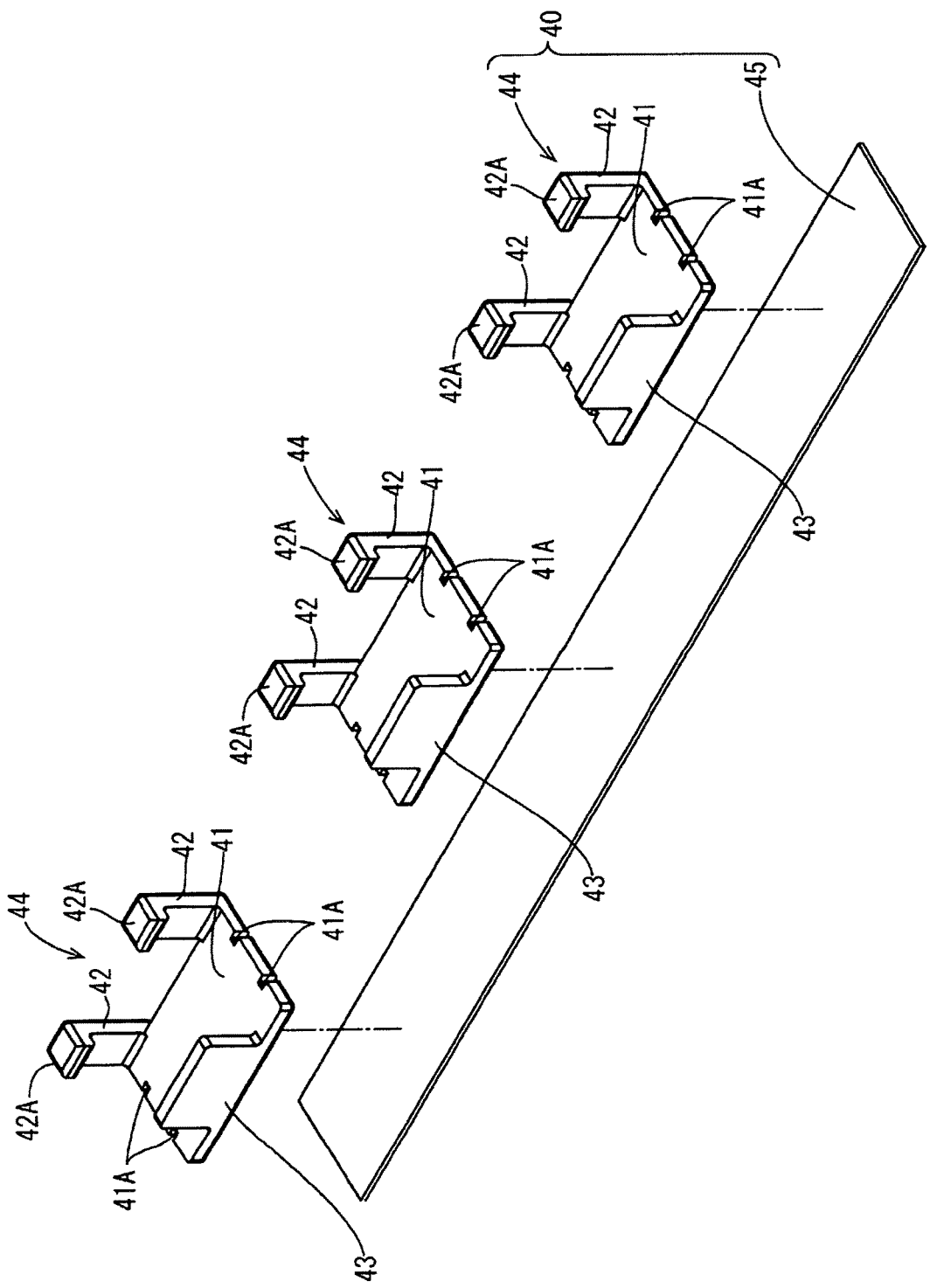
FIG. 25 is an exploded perspective view of a connector holding member.
Figure 26:
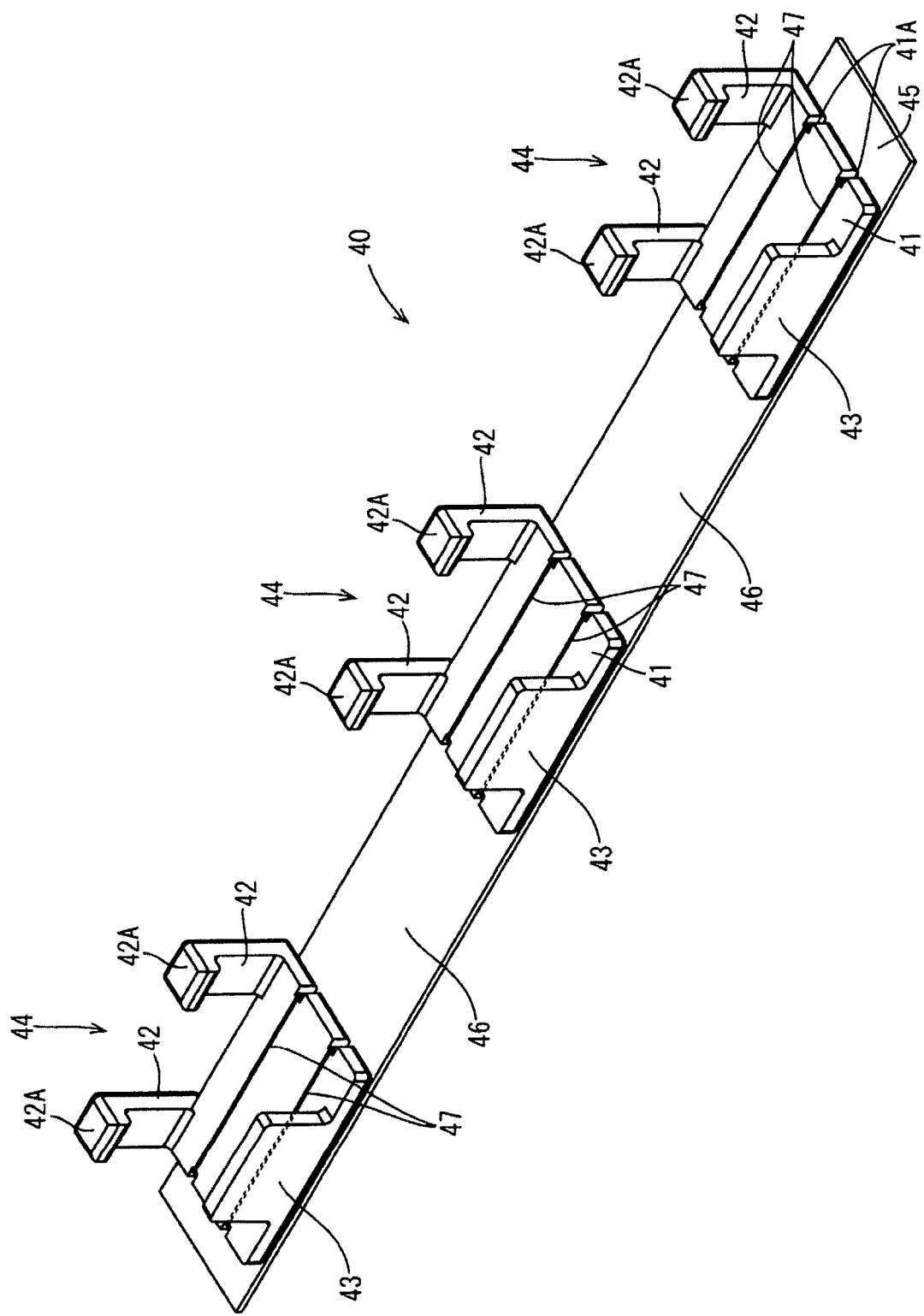
FIG. 26 is a perspective view of the connector holding member.
Figure 27:
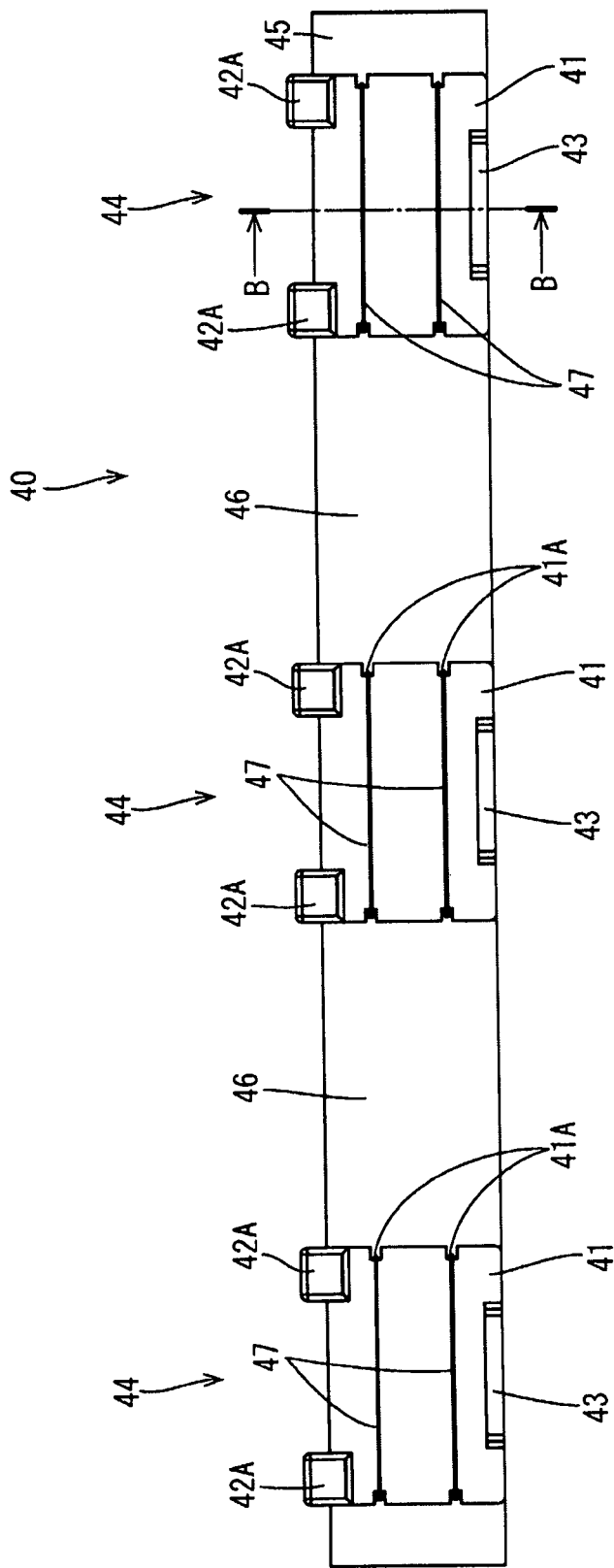
FIG. 27 is a plan view of the connector holding member.
Figure 28:
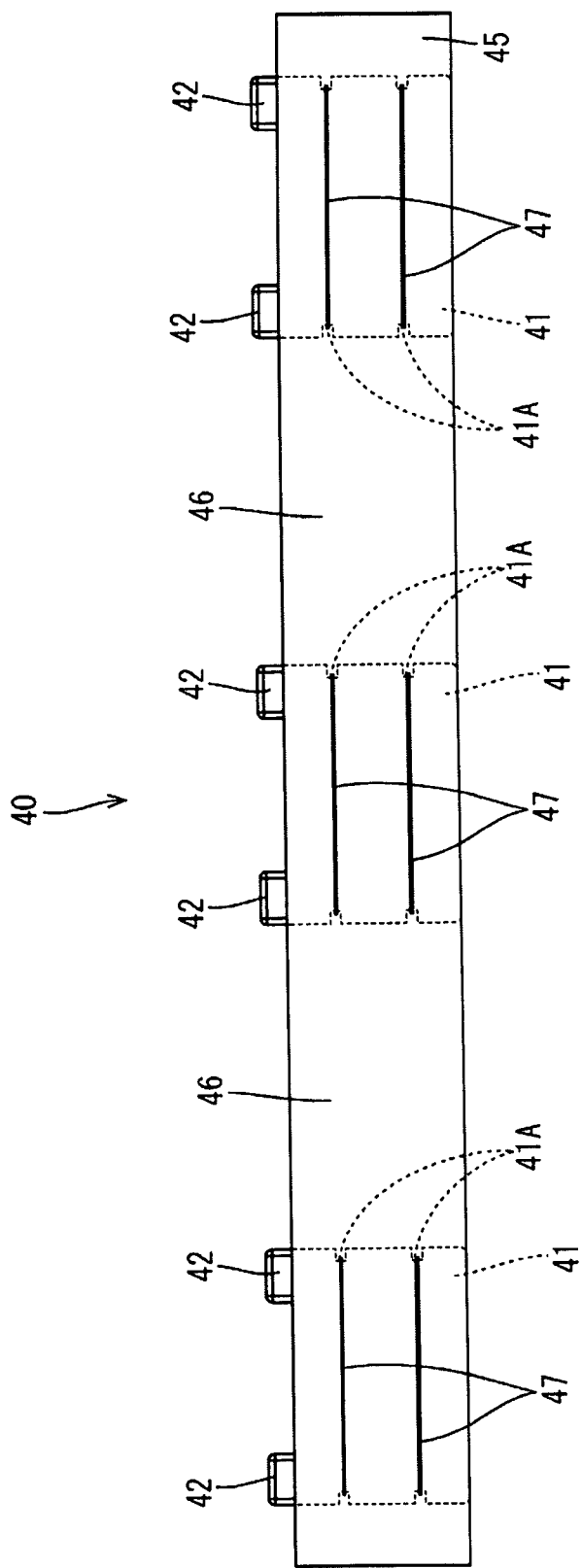
FIG. 28 is a bottom view of the connector holding member.
Figure 29:
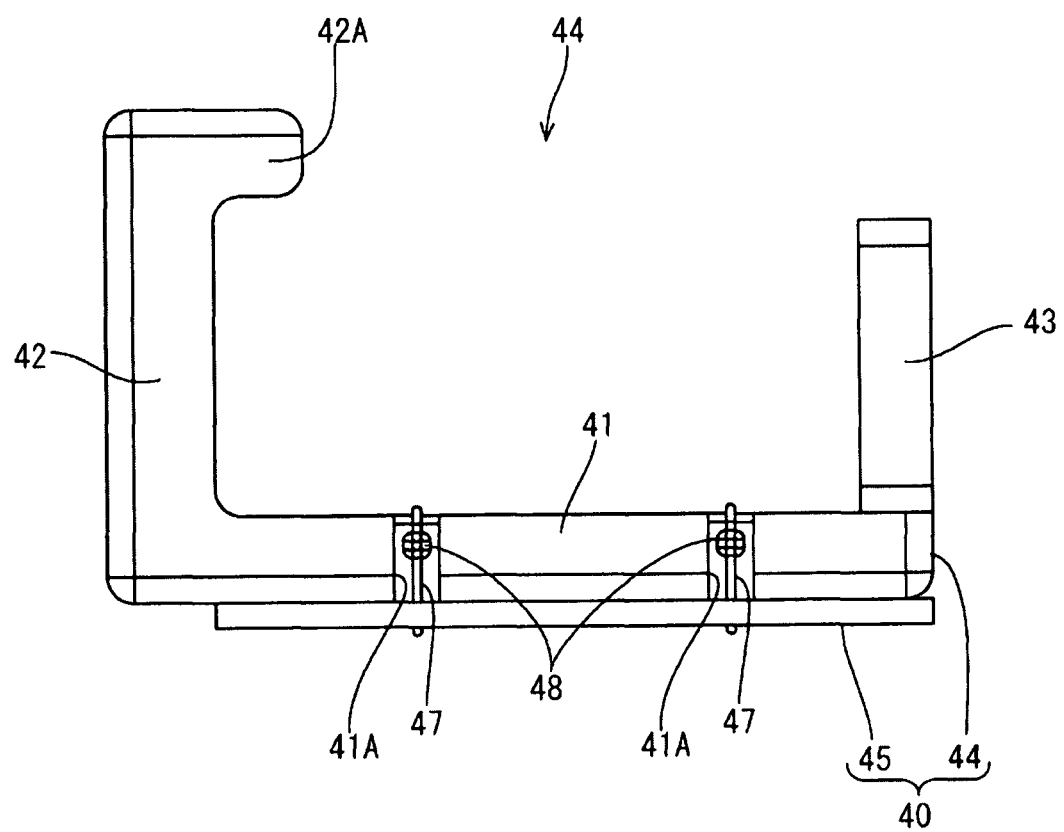
FIG. 29 is a side view of the connector holding member.
Figure 30:
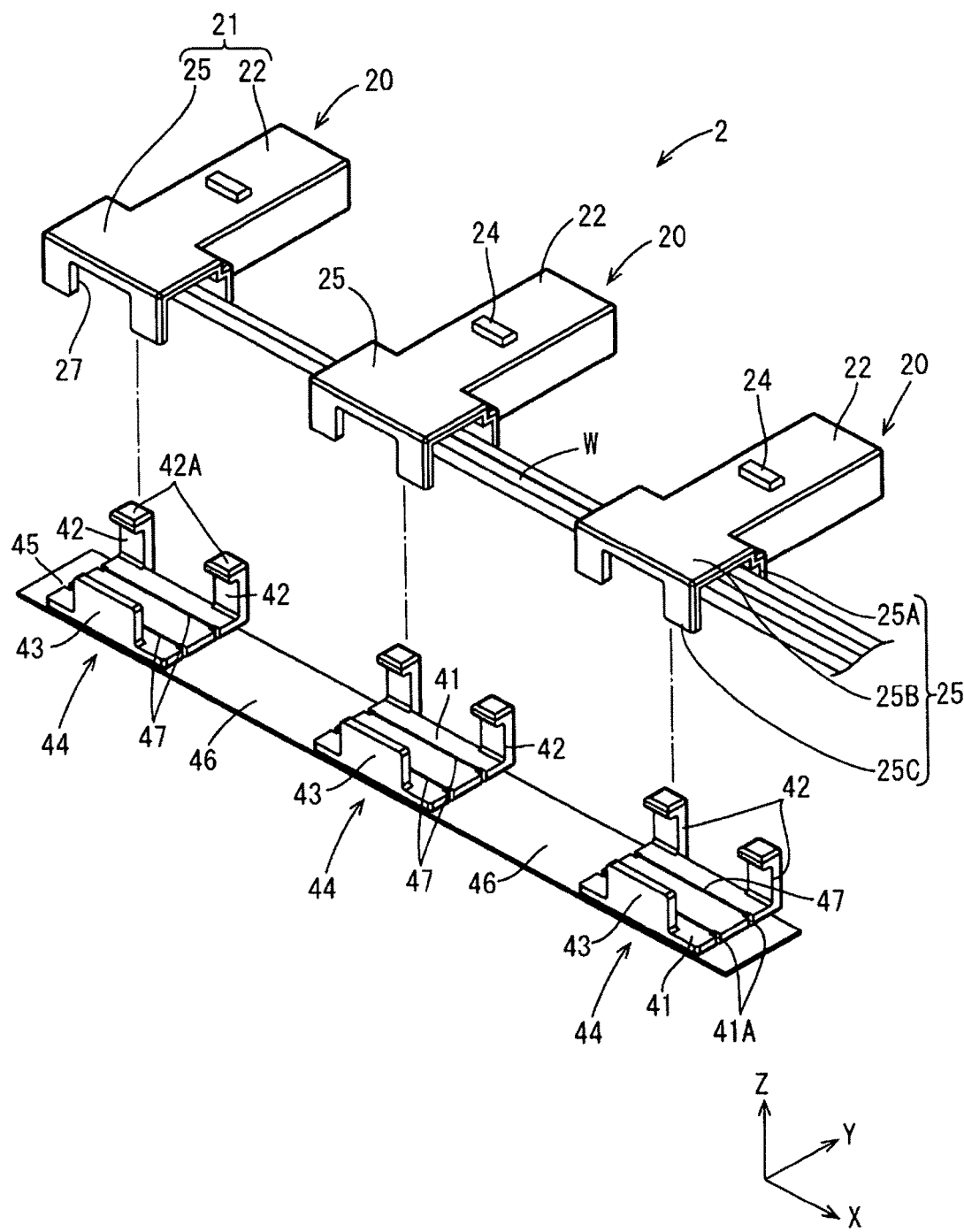
FIG. 30 is an exploded back side perspective view showing the connector holding structure.
Figure 31:
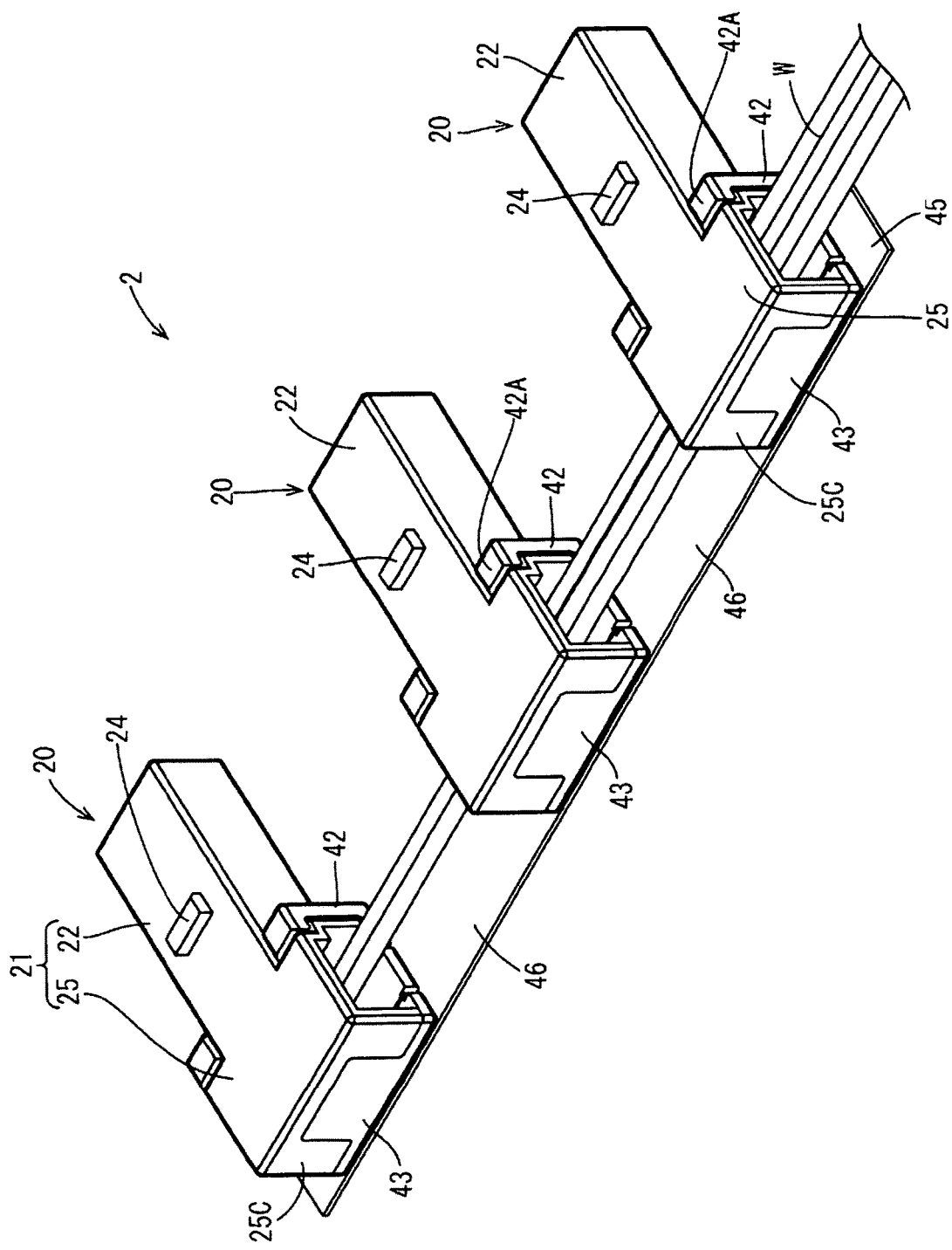
FIG. 31 is a back side perspective view showing the connector holding structure.
Figure 32:
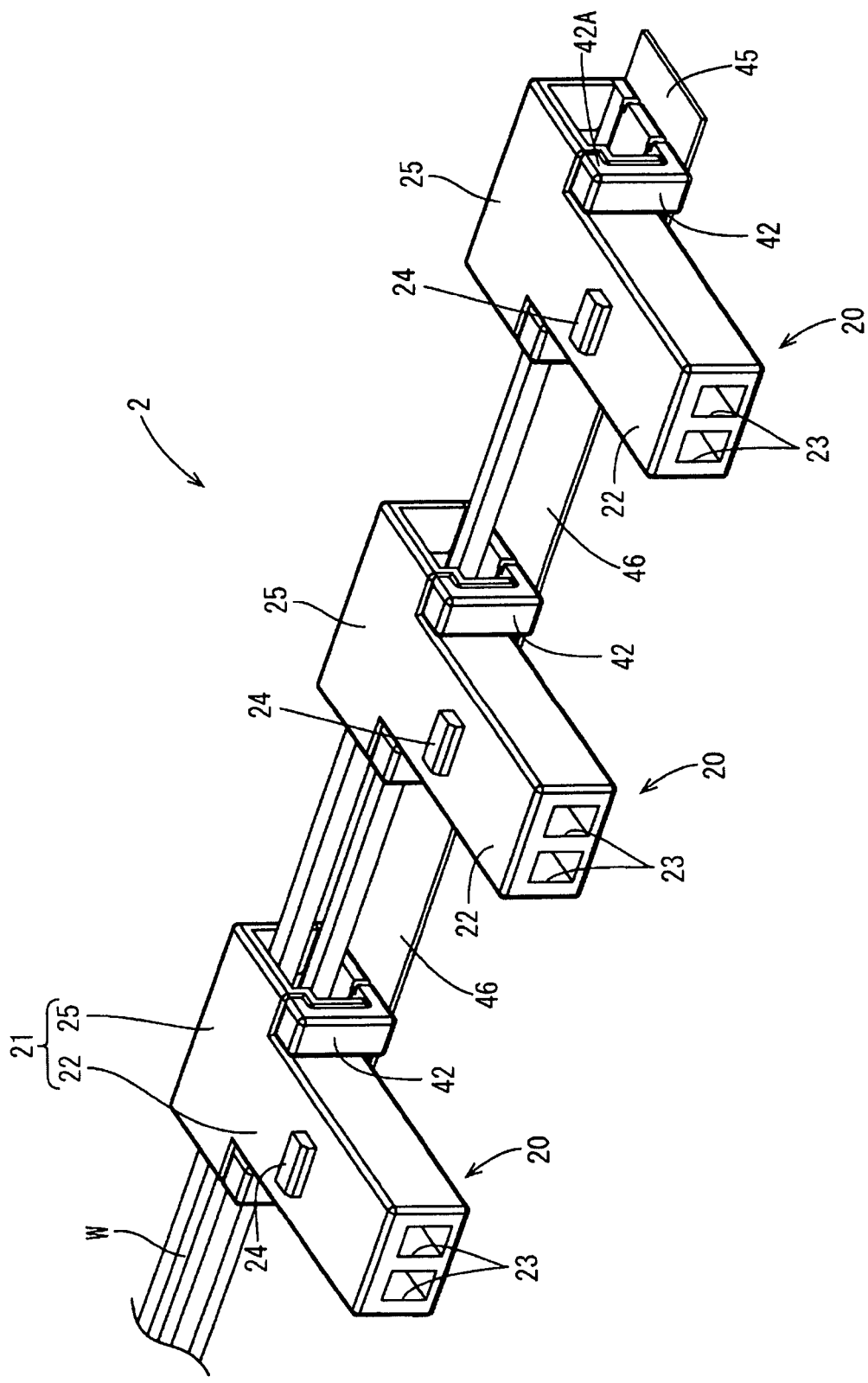
FIG. 32 is a front side perspective view showing the connector holding structure.
Figure 33:
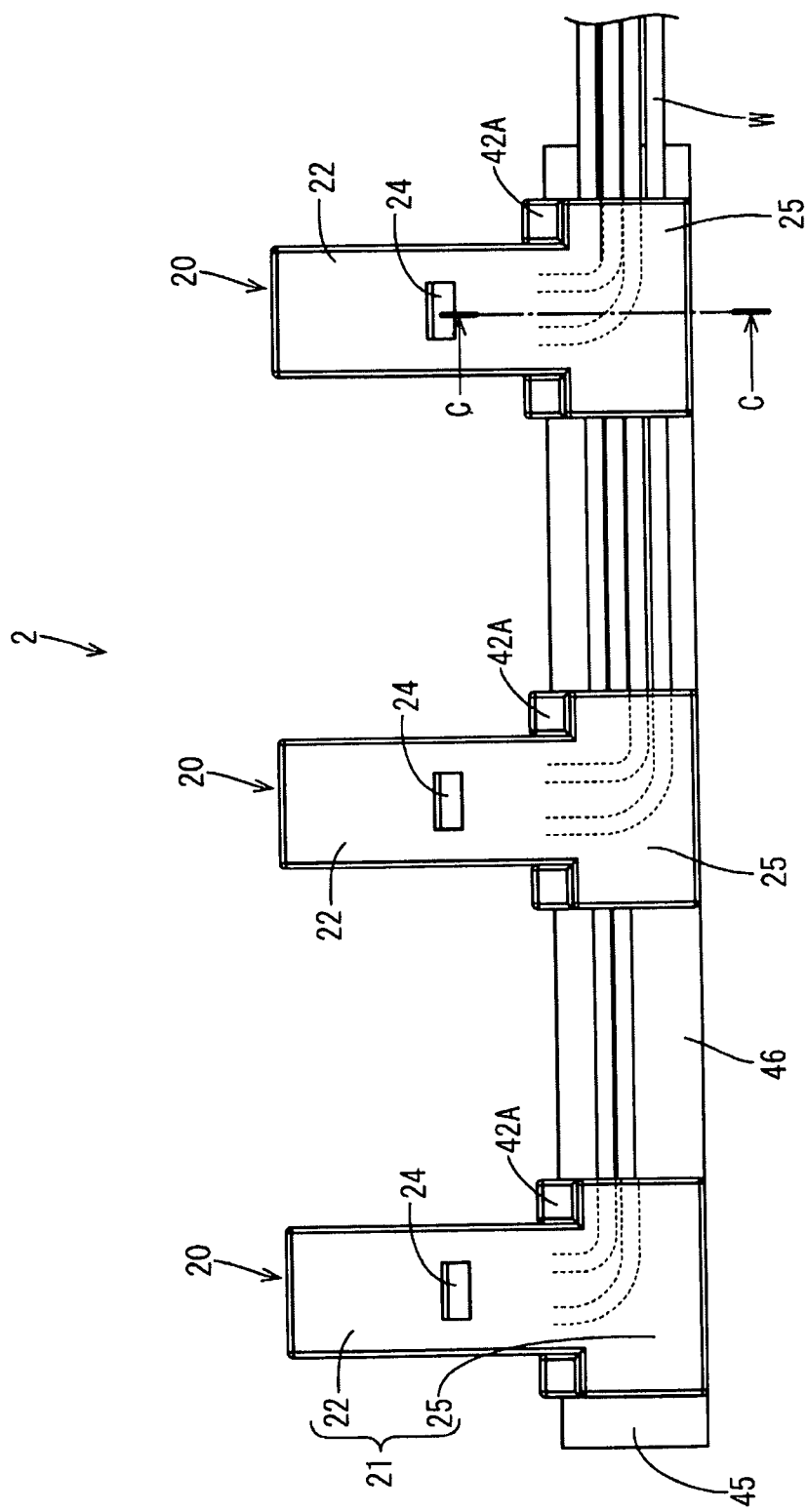
FIG. 33 is a plan view showing the connector holding structure.
Figure 34:
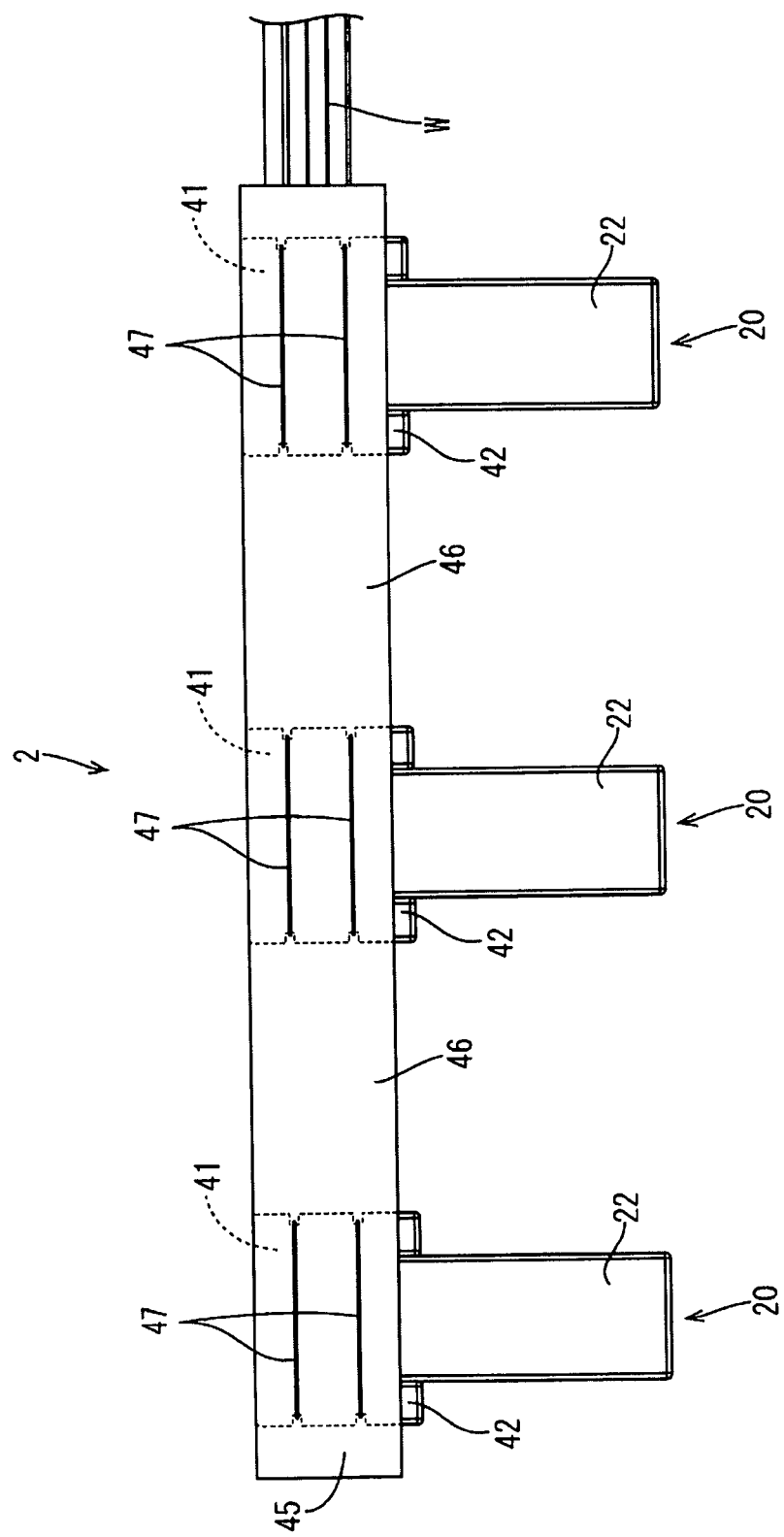
FIG. 34 is a bottom view showing the connector holding structure.
Figure 35:
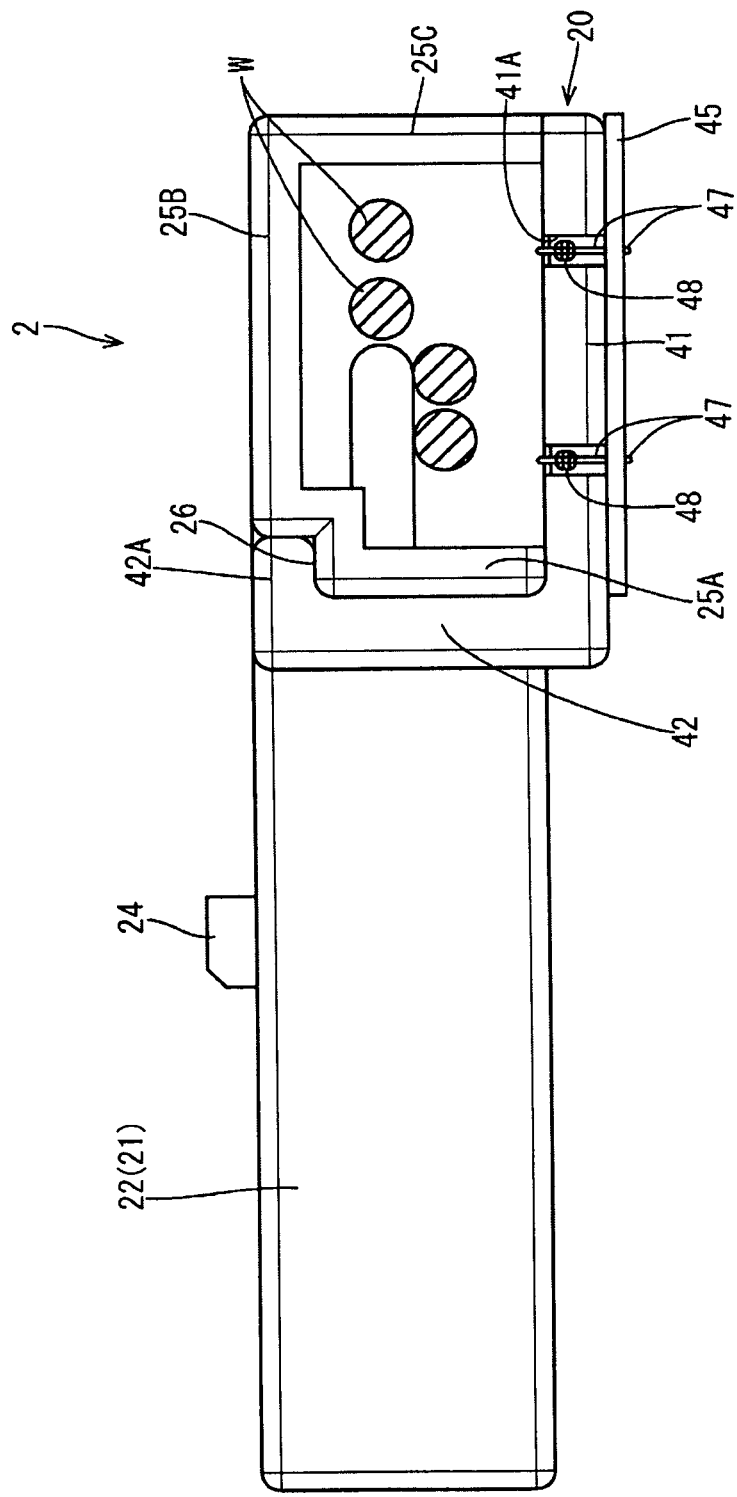
FIG. 35 is a side view showing the connector holding structure.

As shown in FIGS. 25 and 26, the connector holding member 40 of this embodiment is such that connector mounting portions 44 having substantially the same shape as the connector mounting portions 34 of the first embodiment are fixed to a separate flexible sheet 45.

The connector mounting portions 44 include plate-like lids 41 for individually closing openings that open downward of wiring grooves 25 of respective housings 21 from below. Resiliently deformable locking pieces 42 extend up from both end parts of the front end of each lid 41, and closing portions 43 likewise extend up from a central part of the rear end of each lid 41.

Locking claws 42A project rearward on the tips of the locking pieces 42, and the locking pieces 42A lock locked portions 26 of the wire-side connector 20 when the opening of the wiring groove 25 of the housing 21 is closed by the lid 41.

Further, the closing portion 43 is dimensioned to tightly close an escaping portion 27 when the opening of the wiring groove 25 of the housing 21 is closed by the lid 41.

Two fixing grooves 41A extend in a plate thickness direction (vertical direction, Z direction) on each side edge of the lid 41 of the connector mounting portion 44 of this embodiment different from side edges where the pair of locking pieces 42 and the closing portion 43 are provided.

The flexible sheet 45 is, for example, made of rubber and in the form of an elongated strip having a width equal to a width of the connector mounting portion 44 in the front-rear direction (Y direction).

The connector mounting portions 44 are fixed to the flexible sheet 45 by being sewed, for example, using threads 47 made of synthetic resin. The threads 47 fix the connector mounting portions 44 at predetermined positions of the flexible sheet 45 while being passed between the fixing grooves 41A facing each other (see FIGS. 26 to 29). Note that knots 48 of the threads 47 are preferably accommodated in the fixing grooves 41A (see FIG. 29).

In the completed connector holding member 40, parts of the flexible sheet 45 between adjacent ones of the connector mounting portions 44 serve as flexible portions 46 deflectable and deformable by rubber elasticity.

Figure 36:
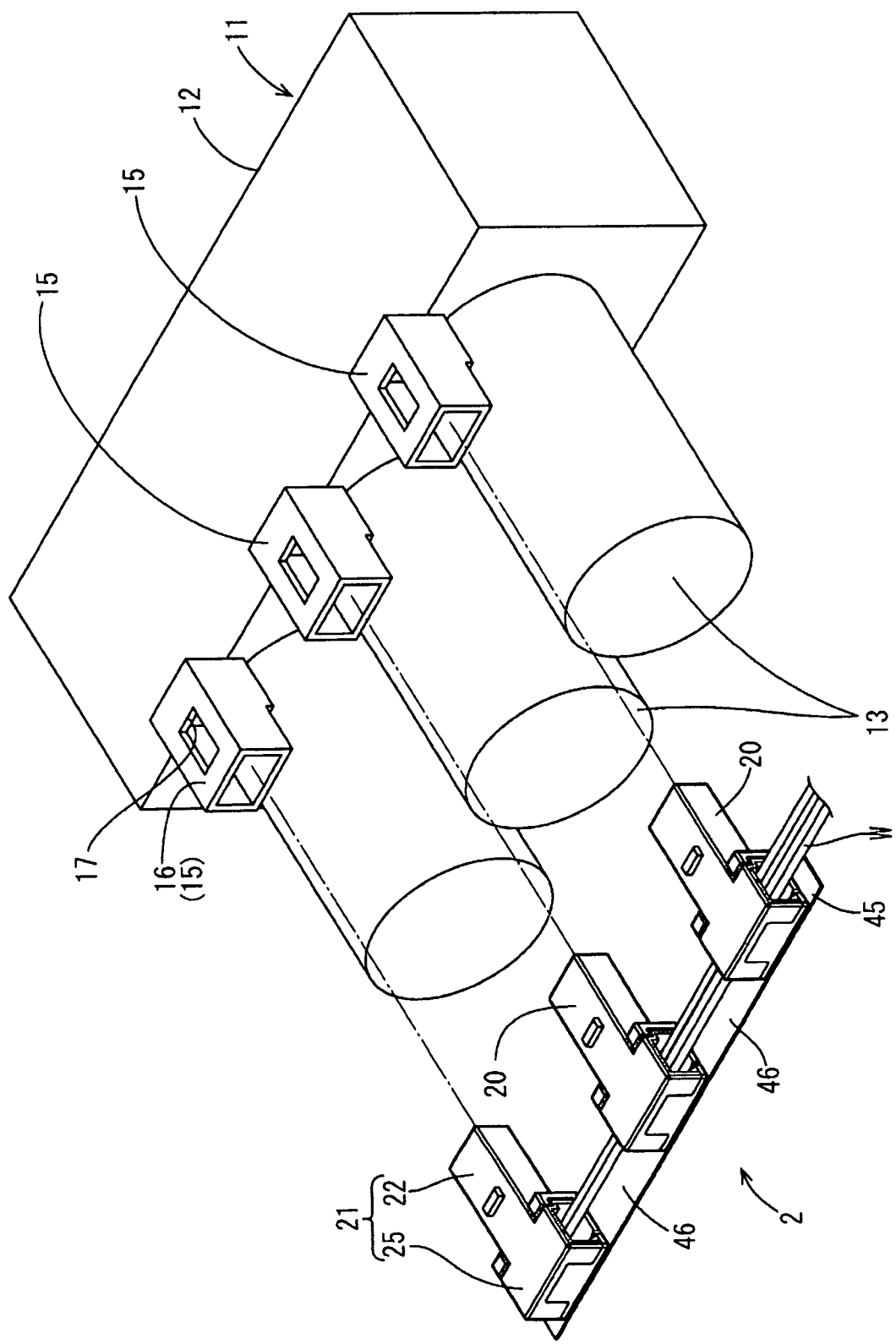
FIG. 36 is a back side perspective view showing a state before being connected to the device-side connectors.
Figure 37:
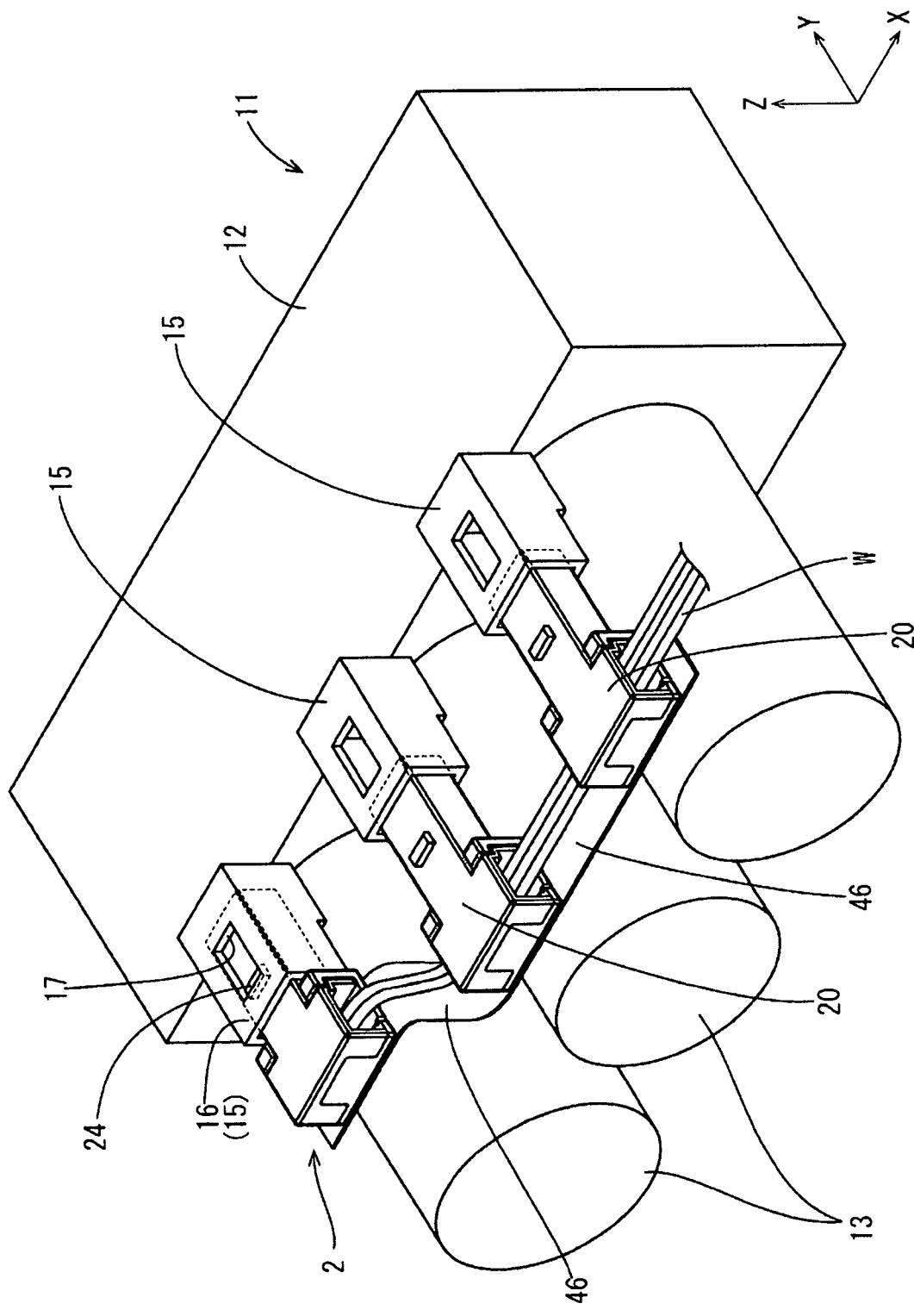
FIG. 37 is a back side perspective view showing a connection process to the device-side connectors.

In connecting the wire-side connectors 20 to the device-side connectors 15 by the connector holding structure 2 of this embodiment, the wire-side connectors 20 collectively held by the connector holding member 40 are brought closer to the device-side connectors 15 and successively inserted into receptacles 16 of the device-side connectors 15 from an end (see FIGS. 36 and 37). In this connection process, adjacent wire-side connectors 20 are displaced in the front-rear direction (Y direction) from the proper arrangement direction (X direction). However, since the deflectable and deformable flexible portion 46 is present between these wire-side connectors 20, a displacement is absorbed by the flexible portion 46.

Figure 38:
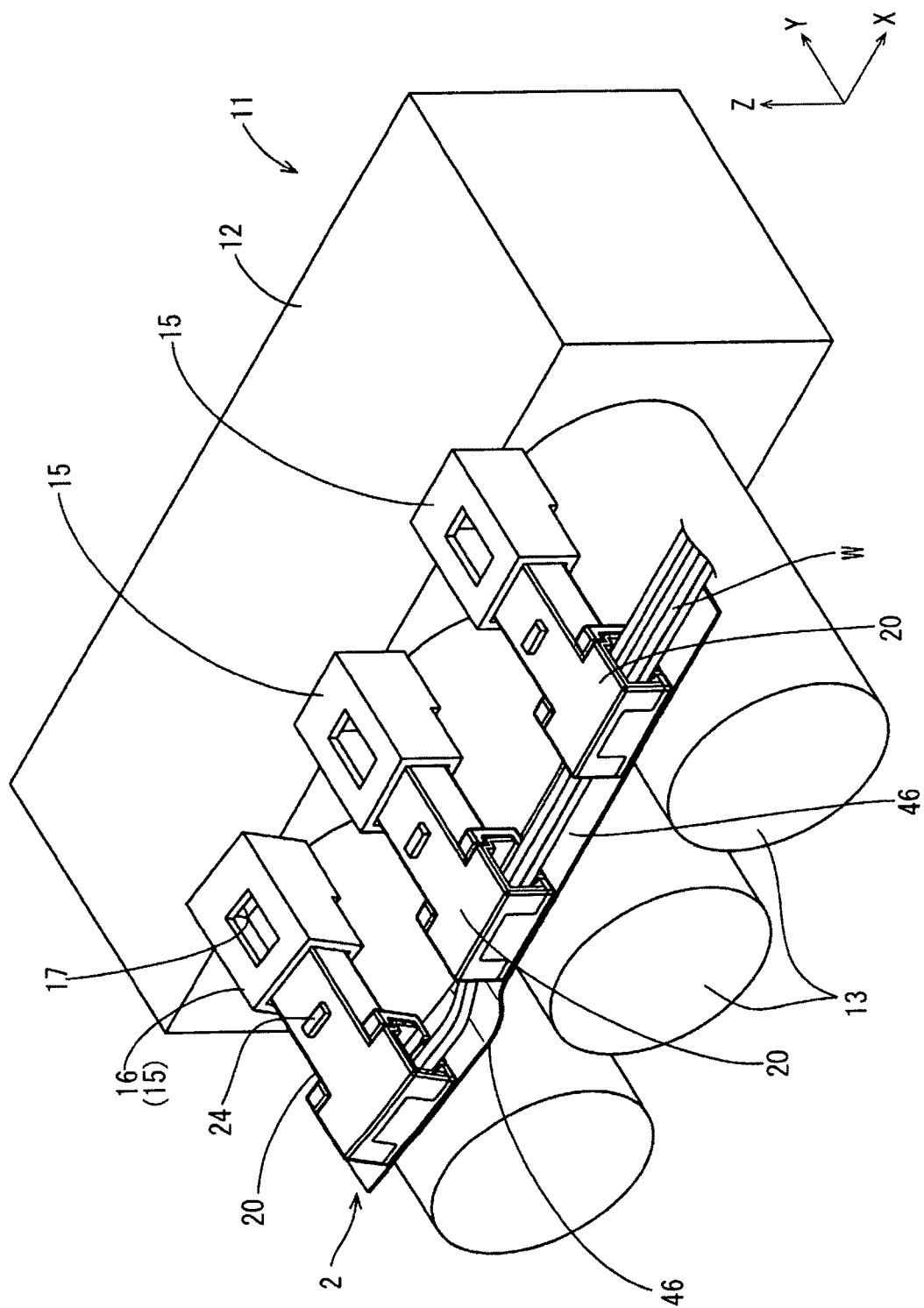
FIG. 38 is a back side perspective view showing a case where inclination has occurred in the connection process to the device-side connectors.
Figure 39:
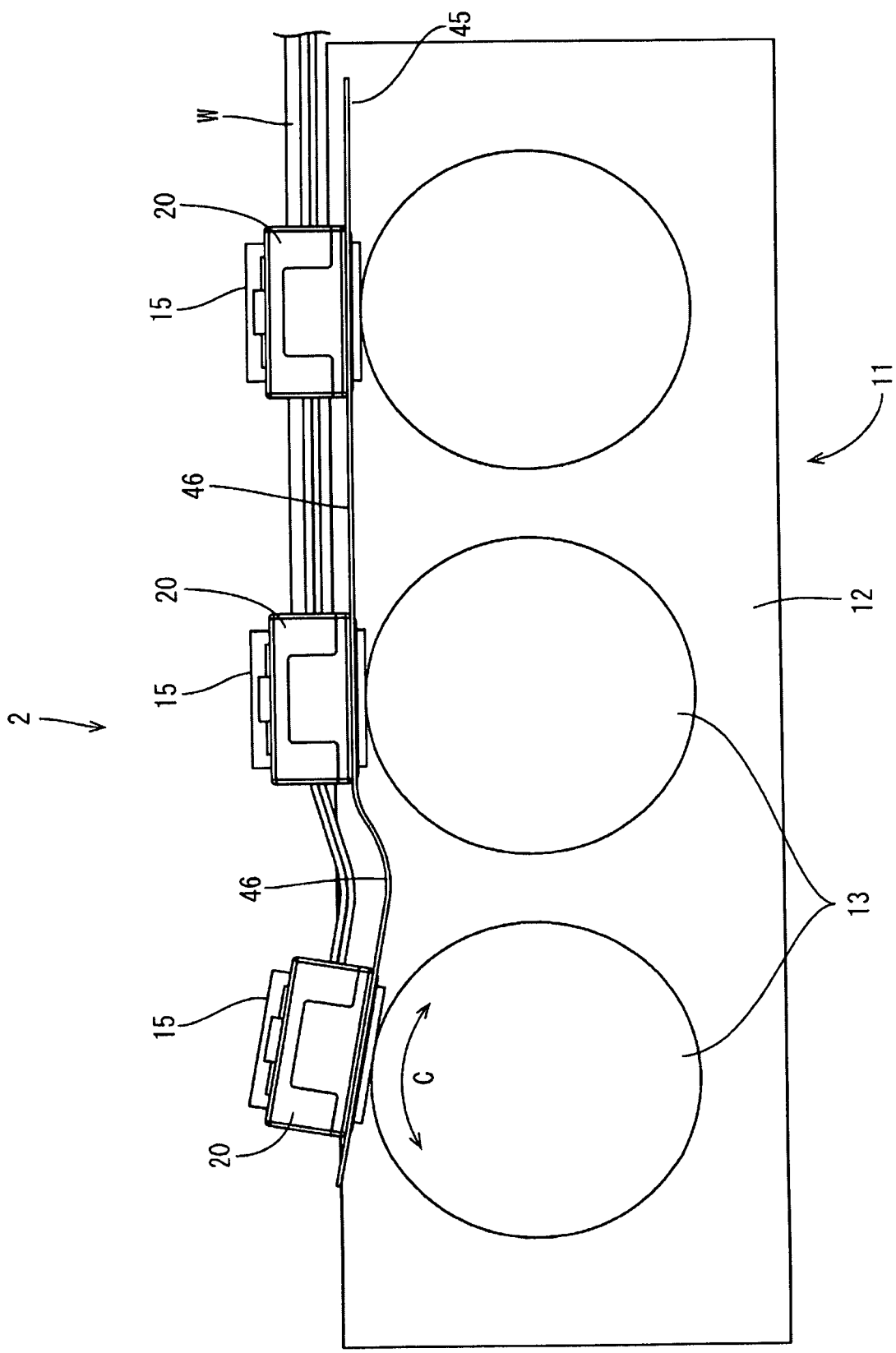
FIG. 39 is a back view showing the case where inclination has occurred in the connection process to the device-side connectors.
Figure 40:
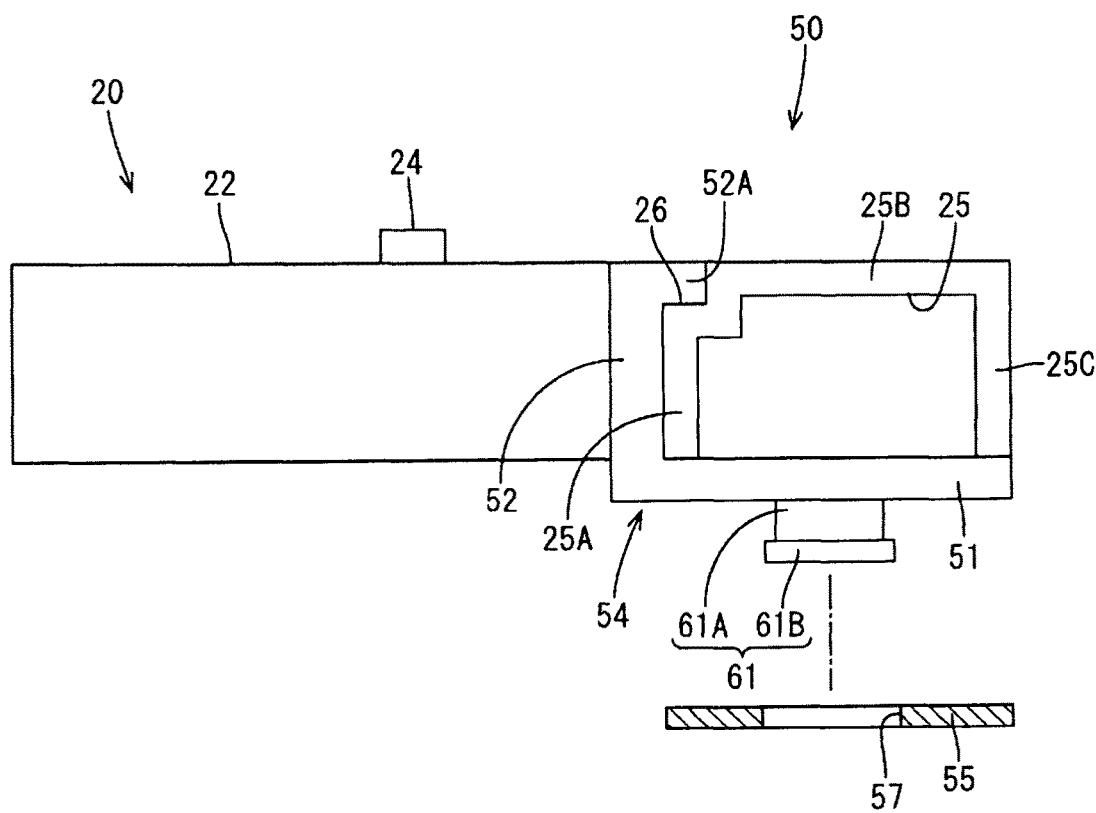
FIG. 40 is an exploded perspective view showing a connector holding structure of a third embodiment.
Figure 41:
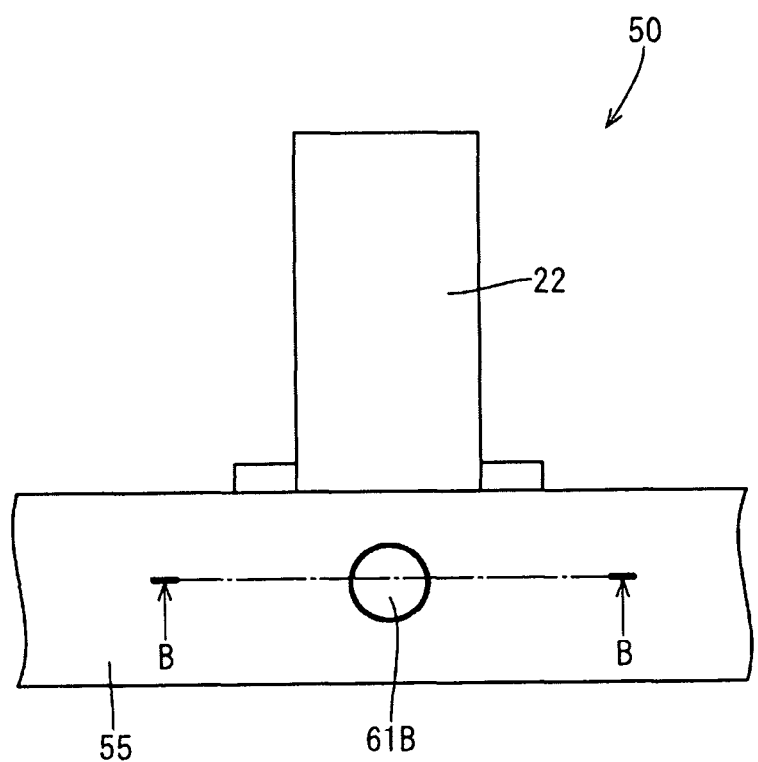
FIG. 41 is a partial enlarged bottom view showing the connector holding structure.
Figure 42:
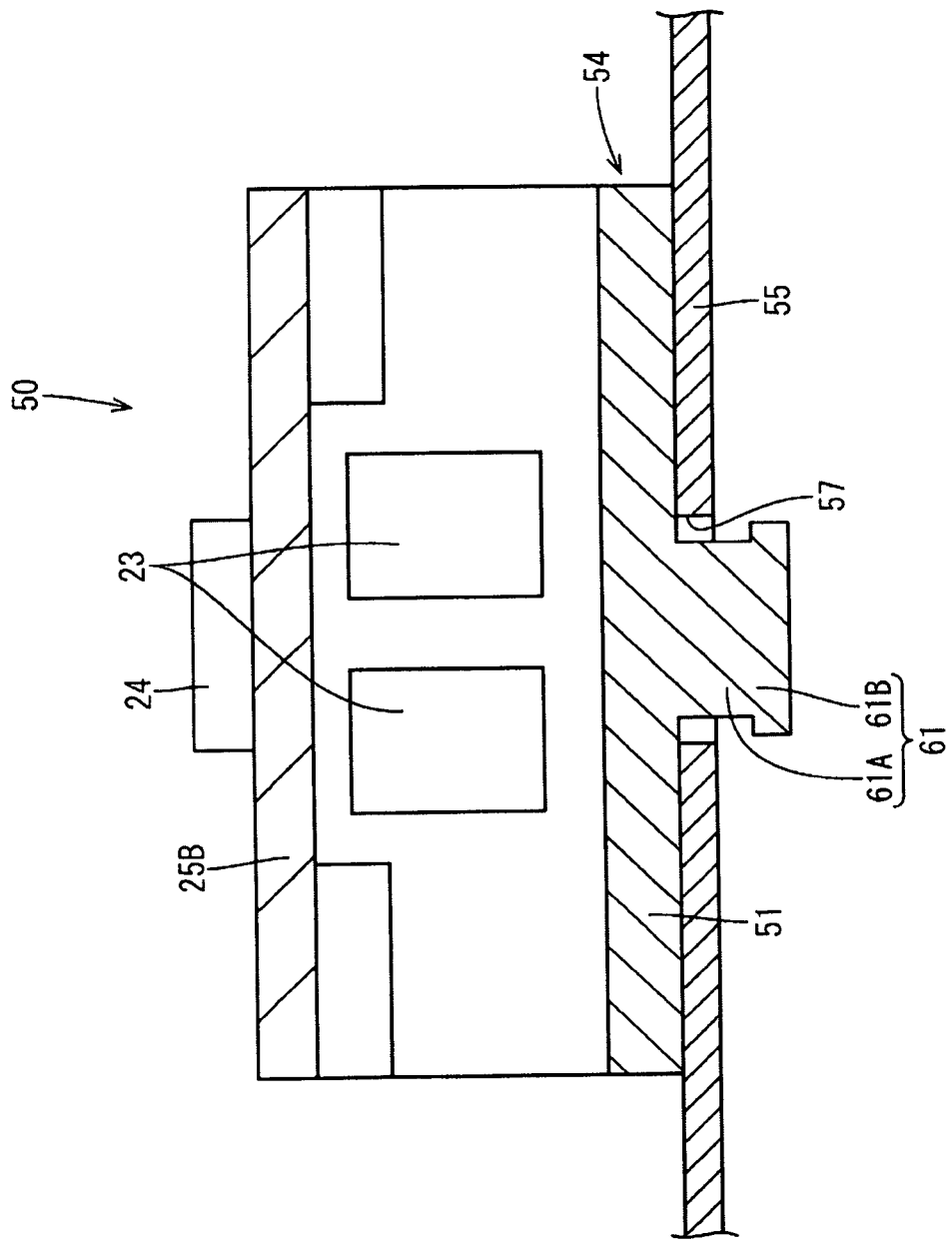
FIG. 42 is a section along B-B of FIG. 41 (during mounting).
Figure 43:
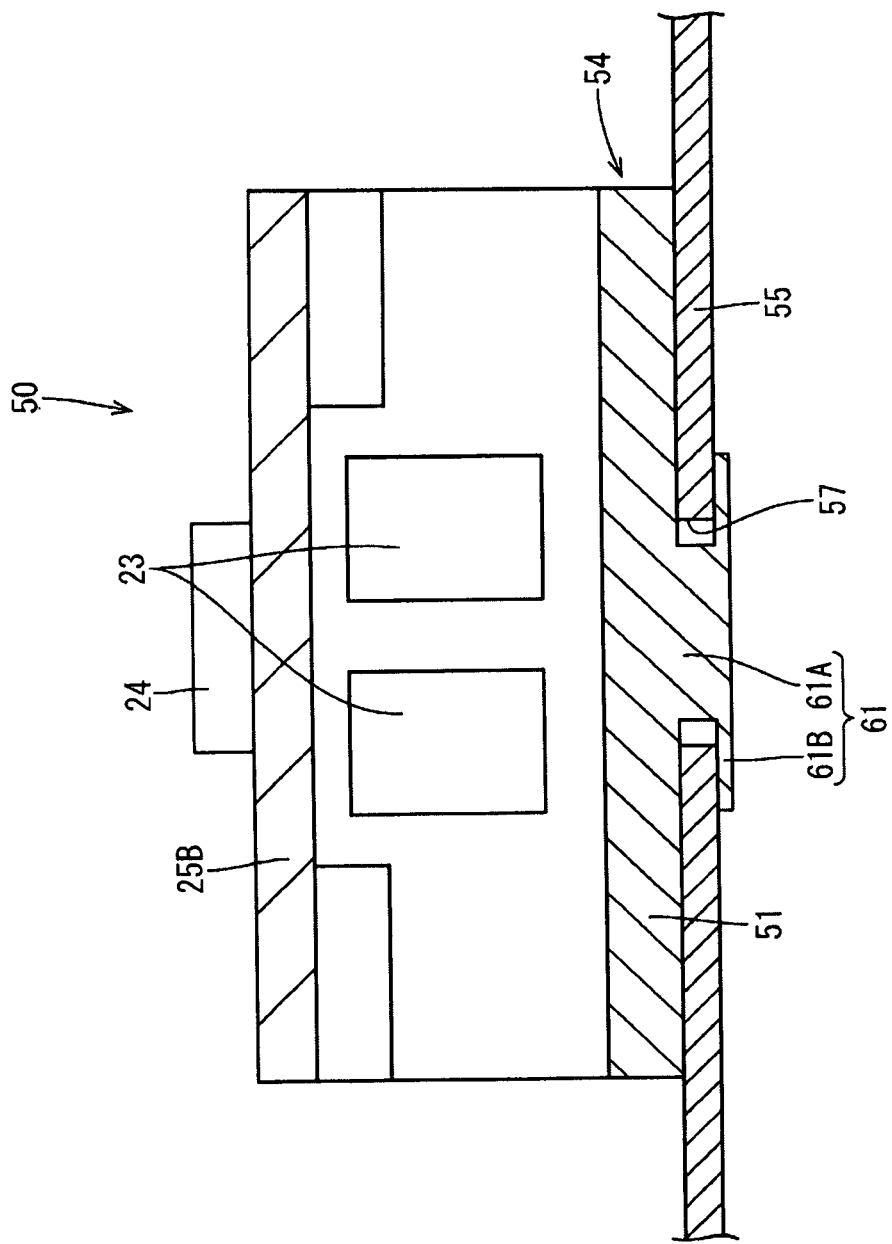
FIG. 43 is a section along B-B of FIG. 41 (after mounting).

Further, even if the solenoid valve 13 is mounted on the valve body 12 while being somewhat rotated as shown in FIGS. 38 and 39, the deflectable and deformable flexible portion 46 is provided between the adjacent wire-side connectors 20 according to the connector holding structure 2 of this embodiment, wherefore inclination is absorbed by the flexible portion 46.

As just described, work efficiency in connecting the wire-side connectors 20 to the device-side connectors 15 can be improved also by the connector holding structure 2 of this embodiment.

Third Embodiment

A third embodiment is described with reference to FIGS. 40 to 43. A connector holding structure 3 of this embodiment is such that connector mounting portions 54 are mounted on a flexible sheet 55 in the form of an elongated strip as in the second embodiment, but differs from that of the second embodiment in how to mount the connector mounting portions 54 on the flexible sheet 55. Further, the flexible sheet 55 of this embodiment is made of nylon 6, 6. The same components as those of the second embodiment are denoted by reference signs obtained by adding 10 to the reference signs of the second embodiment and repeated description is omitted.

The connector mounting portion 54 of this embodiment is made of oil-resistant resin such as nylon 6T or fluororesin, and a lid 51 thereof is provided with a mounting protrusion 61 for mounting the lid 51 on the flexible sheet 55 instead of the fixing grooves 41A of the connector mounting portion 44 of the second embodiment. The mounting protrusion 61 is composed of a shaft 61A convexly projecting from a center of a plate surface of the lid 51 in a direction opposite to projecting directions of locking pieces 52 and a closing portion and configured to penetrate through a mounting hole 57 provided in the flexible sheet 55 and an enlarged diameter portion 61B enlarged in diameter in a direction intersecting the projecting direction of the shaft 61A on the tip of the shaft 61A, and the connector mounting portion 54 is retained and mounted on the flexible sheet 55 by locking the enlarged diameter portion 61B to a peripheral edge part of the mounting hole 57 (see FIG. 43).

Such a connector mounting portion 54 of this embodiment is retained on the flexible sheet 55 by squeezing the enlarged diameter portion 61B, for example, by hot pressing, to be larger in diameter than an inner diameter of the mounting hole 57 after the mounting protrusion 61 including the enlarged diameter portion 61B before squeezing having a smaller diameter than the mounting hole 57 is passed through the mounting hole 57 of the flexible sheet 55. In this state, a clearance enabling the shaft portion 61A to move in the mounting hole 57 is provided between the outer surface of the shaft portion 61A and the inner surface of the mounting hole 57 (see FIGS. 42 and 43).

By dimensioning the mounting protrusion 61 to form the clearance between the outer surface of the shaft 61A and the inner surface of the mounting hole 57 in advance in this way (see FIG. 43), tolerances caused by thermal expansion can be absorbed by the clearance, for example, even if there is a difference in thermal expansion coefficient between the connector mounting portion 54 and the flexible sheet 55. Further, even if adjacent connectors are inclined with respect to each other, inclination is more easily absorbed as compared to a configuration having no such clearance.

As just described, workability in connecting the plurality of wire-side connectors 20 to the plurality of device-side connectors 15 can be improved also by the connector holding structure 3 of this embodiment.

Modification of Third Embodiment

Figure 44:
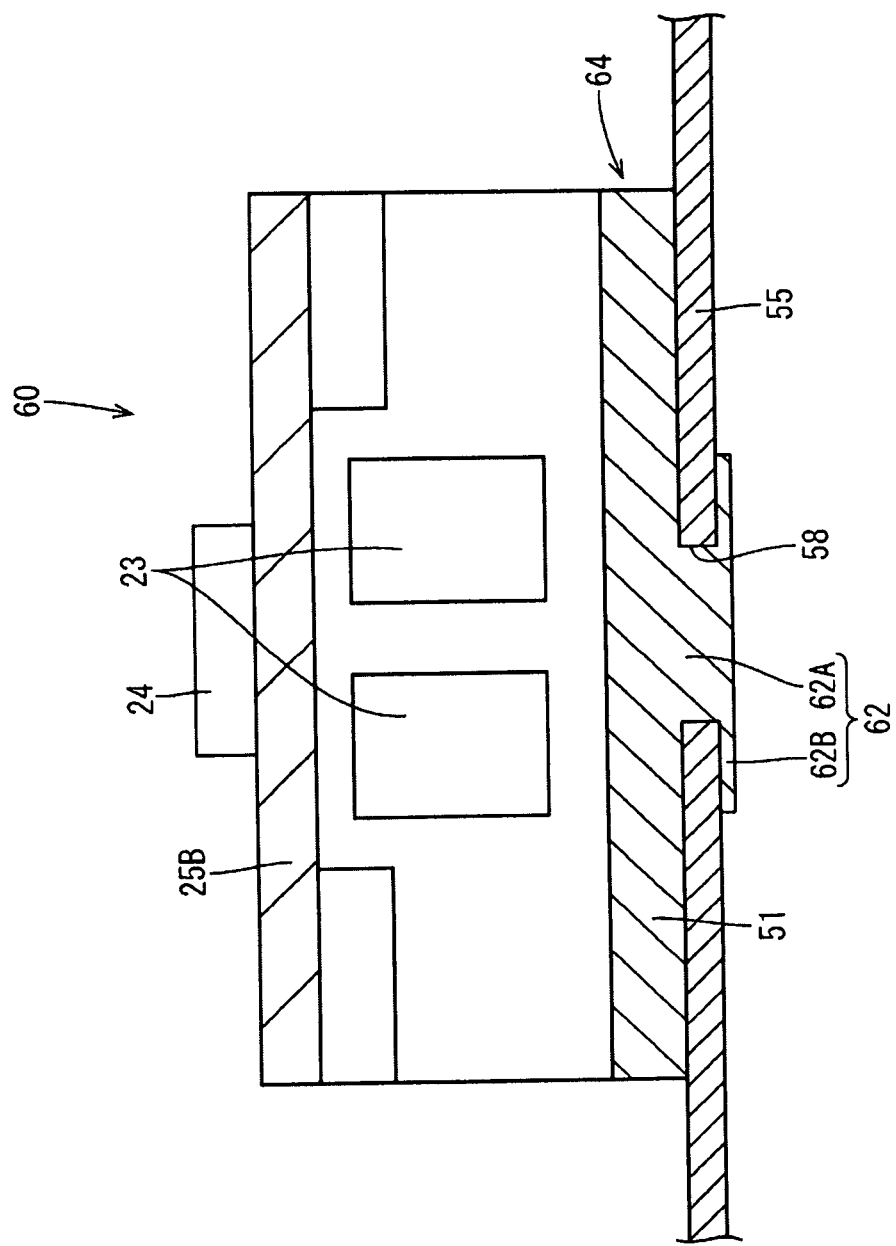
FIG. 44 is a partial enlarged section showing a connector holding structure of a modification of the third embodiment.

Although the clearance is provided between the outer surface of the shaft 61A and the inner shaft of the mounting hole 57 in the above third embodiment, no clearance may be provided between the outer surface of the shaft 61A and the inner shaft portion of a mounting hole 58 (see FIG. 44). In such a case, a connector mounting portion 64 can be mounted on the flexible sheet 55 in a state free from rattling. Further, even if the connector mounting portion 64 and the flexible sheet 55 are twisted or distorted with respect to each other, a force can be dispersed by receiving a shaft portion 62A of a mounting protrusion 62 by the entire inner surface of the mounting hole 58, wherefore a crack or fracture of the flexible sheet 55 can be suppressed as compared to a configuration in which a force is locally applied to a specific area of the mounting hole 58 as in the above third embodiment. Note that, if this configuration is employed, the mounting protrusion 62 and the mounting hole 58 are preferably integrated, for example, by heat fusion.

OTHER EMBODIMENTS

The technique disclosed by this specification is not limited to the above described and illustrated embodiments. For example, the following embodiments also are included in a scope of the invention.

Although the wiring groove 25 is integrally provided to the housing 21 of the wire-side connector 20 in the above embodiments, the wiring groove 25 may be omitted.

Although the connector mounting portion 34, 44, 54, 64 is configured to hold a part of the wiring groove 25 of the wire-side connector 20 in the above embodiments, a part to be held is not limited to the wiring groove 25 and, for example, a part of the housing body 22 may be held.

Although the connector holding member 30, 40, 50, 60 is provided with the lids 31, 41, 51 for closing the openings of the wiring grooves 25 in the above embodiments, separate lids for closing the openings may be provided.

The forms of the flexible portions are not limited to those of the above embodiments and can be changed as appropriate as long as the flexible portions have flexibility.

Although the connector mounting portions 44, 54, 64 are mounted on the flexible sheet 45, 55 by the threads 47 and the mounting protrusions 61, 62 in the above second and third embodiments, a mounting method is not limited to these. For example, fixing by adhesive or the like may be employed.

Although the part enlarged in diameter in advance is provided on the tip of the mounting protrusion 61, 62 and this part enlarged in diameter is squeezed for retaining in the above third embodiment, the shaft portion 61A, 62A may be directly squeezed to form the enlarged diameter portion 61B, 62B without providing the part enlarged in diameter.

Although the enlarged diameter portion 61B, 62B is provided over the entire circumference of the shaft 61A, 62A in the above third embodiment, the enlarged diameter portion 61B, 62B may be provided only on a part of the shaft 61A, 62A in a circumferential direction. In short, the enlarged diameter portion 61B, 62B only has to be capable of being retained on the flexible sheet 55.

LIST OF REFERENCE SIGNS 1, 2, 3: connector holding structure
15: device-side connector (mating connector)
16: receptacle
20: wire-side connector (connector)
21: housing
22: housing body,
25: wiring groove
30, 40, 50, 60: connector holding member
31, 41, 51: lid
34, 44, 54, 64: connector mounting portion
35: first flexible portion (flexible portion)
36: second flexible portion (flexible portion)
45, 55: flexible sheet
46, 56: flexible portion
47: thread
57, 58: mounting hole (hole)
61, 62: mounting protrusion
61A, 62A: shaft
61B, 62B: enlarged diameter portion
W: wire
C: circumferential direction
X: arrangement direction
Y: connecting direction
Z: direction intersecting arrangement direction and connecting direction

The invention claimed is:

1. A connector holding structure, comprising:
a plurality of connectors to be connected to a plurality of mating connectors arranged in an arrangement direction;
a plurality of wires drawn out from the plurality of connectors; and
a connector holding member including a plurality of connector mounting portions for respectively holding the plurality of connectors, the connector holding member collectively holding the plurality of connectors,
the connector holding member including a deflectable and deformable flexible portion between adjacent ones of the plurality of connector mounting portions.

2. The connector holding structure of claim 1, wherein the flexible portion includes a first flexible portion deflectable and deformable in the arrangement direction of the plurality of connectors and a connecting direction to the mating connectors and a second flexible portion deflectable and deformable in a direction intersecting the arrangement direction and the connecting direction and the arrangement direction.

3. The connector holding structure of claim 1, wherein the connector is integrally provided with a wiring groove for accommodating the plurality of wires along the arrangement direction of the plurality of connectors.

4. The connector holding structure of claim 1, wherein the connector holding member is configured such that the plurality of connector mounting portions are mounted on a flexible sheet extending along the arrangement direction of the plurality of connectors.

5. The connector holding structure of claim 4, wherein the connector mounting portion is mounted on the flexible sheet by a mounting protrusion including a shaft portion projecting toward the flexible sheet and configured to penetrate through a hole formed in the flexible sheet and an enlarged diameter portion enlarged in diameter on a tip side of the shaft portion and to be locked to a peripheral edge part of the hole.

6. The connector holding structure of claim 5, wherein the connector is integrally provided with a wiring groove for accommodating the plurality of wires along the arrangement direction of the plurality of connectors.

7. The connector holding structure of claim 6, wherein an opening of the wiring groove is closed by the connector holding member.

* * * * *